United States Patent
Lim et al.

(10) Patent No.: US 12,439,077 B2
(45) Date of Patent: *Oct. 7, 2025

(54) IMAGE ENCODING/DECODING METHOD AND APPARATUS FOR THROUGHPUT ENHANCEMENT USING MOTION VECTOR REFINEMENT

(71) Applicants: Electronics and Telecommunications Research Institute, Daejeon (KR); CHIPS & MEDIA, INC, Seoul (KR)

(72) Inventors: Sung Chang Lim, Daejeon (KR); Jung Won Kang, Daejeon (KR); Ha Hyun Lee, Seoul (KR); Jin Ho Lee, Daejeon (KR); Hui Yong Kim, Daejeon (KR); Dae Yeon Kim, Seoul (KR); Dong Jin Park, Seoul (KR); Myoung Hun Jang, Seongnam-si (KR); Wook Je Jeong, Gwacheon-si (KR)

(73) Assignees: Electronics and Telecommunications Research Institute, Daejeon (KR); CHIPS & MEDIA, INC, Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/493,577

(22) Filed: Oct. 24, 2023

(65) Prior Publication Data

US 2024/0056602 A1  Feb. 15, 2024

Related U.S. Application Data

(63) Continuation of application No. 17/256,586, filed as application No. PCT/KR2019/007930 on Jun. 28, 2019.

(30) Foreign Application Priority Data

Jun. 29, 2018 (KR) .................. 10-2018-0075705
Sep. 11, 2018 (KR) .................. 10-2018-0108548
Mar. 4, 2019 (KR) .................. 10-2019-0024880

(51) Int. Cl.
*H04N 11/02* (2006.01)
*H04N 19/119* (2014.01)
(Continued)

(52) U.S. Cl.
CPC .......... *H04N 19/57* (2014.11); *H04N 19/119* (2014.11); *H04N 19/176* (2014.11); *H04N 19/184* (2014.11); *H04N 19/52* (2014.11)

(58) Field of Classification Search
CPC .................................................. H04N 19/57
(Continued)

(56) References Cited

U.S. PATENT DOCUMENTS

| 6,735,249 | B1* | 5/2004 | Karczewicz | ........... H04N 19/46 |
| | | | | 375/E7.129 |
| 2005/0058196 | A1* | 3/2005 | Fernandes | .............. H04N 19/40 |
| | | | | 375/240.2 |

(Continued)

FOREIGN PATENT DOCUMENTS

| CN | 108141604 A | 6/2018 |
| KR | 100772576 B1 | 11/2007 |

(Continued)

OTHER PUBLICATIONS

Chen et al., "Algorithm description for Versatile Video Coding and Test Model 4 (VTM 4)", Joint Video Experts Team (JVET) of ITU-T SG 16 WP 3 and ISO/IEC JTC 1/SC 29/WG 11, 13th Meeting: Marrakech, MA, Jan. 9-18, 2019, Document: JVET-M1002-v2.

(Continued)

*Primary Examiner* — Leron Beck
(74) *Attorney, Agent, or Firm* — BROADVIEW IP LAW, PC

(57) ABSTRACT

There is provided an image encoding/decoding method and apparatus. The image decoding method comprises decoding (Continued)

information on whether or not to perform motion information refinement from a bitstream, obtaining second motion information for first motion information on a current block on the basis of the information and reconstructing at least one of the current block and a neighboring block of the current block by using at least one of the first motion information and the second motion information.

15 Claims, 28 Drawing Sheets

(51) Int. Cl.
  *H04N 19/176* (2014.01)
  *H04N 19/184* (2014.01)
  *H04N 19/52* (2014.01)
  *H04N 19/57* (2014.01)

(58) Field of Classification Search
  USPC ........................................ 375/240.01–240.29
  See application file for complete search history.

(56) References Cited

U.S. PATENT DOCUMENTS

| | | | | |
|---|---|---|---|---|
| 2009/0245351 A1* | 10/2009 | Watanabe | ............... | H04N 19/86 |
| | | | | 375/240.03 |
| 2010/0046620 A1* | 2/2010 | Kang | ..................... | H04N 19/59 |
| | | | | 375/240.12 |
| 2011/0222605 A1* | 9/2011 | Kashiwagi | ........... | H04N 19/187 |
| | | | | 375/E7.076 |
| 2012/0134416 A1* | 5/2012 | Lin | ......................... | H04N 19/52 |
| | | | | 375/E7.123 |
| 2013/0044809 A1* | 2/2013 | Chong | .................... | H04N 19/85 |
| | | | | 375/E7.076 |
| 2013/0215968 A1* | 8/2013 | Jeong | ..................... | H04N 19/52 |
| | | | | 375/240.16 |
| 2013/0315309 A1* | 11/2013 | Lin | ...................... | H04N 19/523 |
| | | | | 375/240.14 |
| 2014/0254679 A1* | 9/2014 | Ramasubramonian | ..................... | |
| | | | | H04N 19/513 |
| | | | | 375/240.15 |
| 2015/0098508 A1* | 4/2015 | Yie | ........................ | H04N 19/51 |
| | | | | 375/240.16 |
| 2016/0100163 A1* | 4/2016 | Rapaka | ................ | H04N 19/182 |
| | | | | 375/240.16 |
| 2016/0286232 A1* | 9/2016 | Li | ........................... | H04N 19/52 |
| 2017/0214932 A1* | 7/2017 | Huang | ................... | H04N 19/70 |
| 2018/0176596 A1 | 6/2018 | Jeong et al. | | |
| 2018/0241998 A1* | 8/2018 | Chen | .................... | H04N 19/109 |
| 2018/0338154 A1* | 11/2018 | Huang | ................... | H04N 19/56 |
| 2019/0020895 A1* | 1/2019 | Liu | ......................... | H04N 19/61 |
| 2019/0141333 A1* | 5/2019 | Lee | ...................... | H04N 19/105 |
| 2019/0200038 A1* | 6/2019 | He | ......................... | H04N 19/90 |
| 2019/0208223 A1* | 7/2019 | Galpin | .................. | H04N 19/52 |
| 2020/0014948 A1* | 1/2020 | Lai | ....................... | H04N 19/172 |
| 2020/0059659 A1* | 2/2020 | Chen | ..................... | H04N 19/96 |
| 2020/0112741 A1* | 4/2020 | Han | .................... | H04N 19/159 |
| 2020/0169745 A1* | 5/2020 | Han | .................... | H04N 19/513 |
| 2020/0404323 A1* | 12/2020 | Esenlik | ................. | H04N 19/80 |

FOREIGN PATENT DOCUMENTS

| | | |
|---|---|---|
| KR | 1020150145688 A | 12/2015 |
| KR | 1020160087209 A | 7/2016 |
| KR | 1020170059422 A | 5/2017 |
| KR | 1020170131448 A | 11/2017 |
| KR | 1020180061060 A | 6/2018 |
| WO | 0186962 A1 | 11/2001 |
| WO | 2016160605 A1 | 10/2016 |
| WO | 2017188566 A1 | 11/2017 |

OTHER PUBLICATIONS

Office Action for CN 201980044126.X by China National Intellectual Property Administration dated Nov. 23, 2023.

Bross, Benjamin et al. "Versatile Video Coding (Draft 4)," Joint Video Experts Team (JVET) of ITU-T SG 16 WP 3 and ISO/IEC JTC 1/SC 29/WG 11. Jan. 2019.

Sakazume, Satoru et al. "Description of video coding technology proposal by JVC," Joint Collaborative Team on Video Coding (JCT-VC) of ITU-T SG16 WP3 and ISO/IEC JTC1/SC29/WG11. Apr. 2010.

Esenlik, Semih et al. "Description of Core Experiment 9 (CE9): Decoder Side Motion Vector Derivation," Joint Video Exploration Team (JVET) of ITU-T SG 16 WP 3 and ISO/IEC JTC 1/SC 29/WG 11. Apr. 2018.

* cited by examiner

| merge candidate index (merge idx) | position from which motion information is obtained |
|---|---|
| 0 | A |
| 1 | B |
| 2 | D |
| 3 | E |
| 4 | temporal motion information |

| merge candidate index (merge idx) | position from which motion information is obtained |
|---|---|
| 0 | A |
| 1 | D |
| 2 | temporal motion information |
| 3 | additional motion information |
| 4 | additional motion information |

| merge candidate index (merge idx) | position from which motion information is obtained |
|---|---|
| 0 | A |
| 1 | B' |
| 2 | D |
| 3 | E' |
| 4 | temporal motion information |

IMAGE ENCODING/DECODING METHOD AND APPARATUS FOR THROUGHPUT ENHANCEMENT USING MOTION VECTOR REFINEMENT

CROSS-REFERENCE TO RELATED APPLICATIONS

The present application is a continuation application of U.S. application Ser. No. 17/256,586, filed on Dec. 28, 2020, which was the National Stage of International Application No. PCT/KR2019/007930 filed on Jun. 28, 2019, which claims priority under 35 U.S.C. 119(a) to Korean Patent Applications: KR10-2018-0075705, filed on Jun. 29, 2018, KR10-2018-0108548, filed on Sep. 11, 2018, and KR10-2019-0024880, filed on Mar. 4, 2019, with the Korean Intellectual Property Office, which are incorporated herein by reference in their entirety.

TECHNICAL FIELD

The present invention relates to an image encoding/decoding method and apparatus, and a recoding medium storing a bitstream. More particularly, the present invention relates to an image encoding/decoding method and apparatus for improving throughput, and a recoding medium storing a bitstream.

BACKGROUND ART

Recently, demands for high-resolution and high-quality images such as high definition (HD) images and ultra high definition (UHD) images, have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques are required for higher-resolution and higher-quality images.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; a transform and quantization technique for compressing energy of a residual signal; an entropy encoding technique of assigning a short code to a value with a high appearance frequency and assigning a long code to a value with a low appearance frequency, etc. Image data may be effectively compressed by using such image compression technology, and may be transmitted or stored.

In conventional image encoding/decoding, motion estimation and refinement, and intra-prediction on a current block is performed after encoding/decoding on a neighboring block has completed, and thus improving in throughput can be limited

DISCLOSURE

Technical Problem

An objective of the present invention is to provide an image encoding/decoding method and apparatus, the method and apparatus being capable of improving throughput.

In addition, another objective of the present invention is to provide a method and apparatus for minimizing dependency on a neighboring block and a current block so that encoding/decoding on the current block is performed before encoding/decoding on the neighboring block has completed so as to improve throughput of the encoder/decoder.

In addition, still another objective of the present invention is to provide a recording medium storing a bitstream generated by the image encoding/decoding method and apparatus of the present invention.

Technical Solution

According to the present invention, there is provided an image decoding method comprising: decoding information on whether or not to perform motion information refinement from a bitstream; obtaining second motion information for first motion information on a current block on the basis of the information; and reconstructing at least one of the current block and a neighboring block of the current block by using at least one of the first motion information and the second motion information.

According to one embodiment, the information on whether or not to perform motion information refinement is signaled through at least one of a parameter set or video parameter set, a sequence parameter set, a subpicture parameter set, a picture parameter set, an adaptation parameter set, a slice header, a tile header, and a brick header.

According to one embodiment, the first motion information is initial motion information on the current block, and the second motion information is information obtained by performing refinement on the first motion information.

According to one embodiment, the second motion information is obtained by partitioning the current block into at least one subblock, and performing motion information refinement on the at least one subblock when the current block is equal to or greater than a predetermined block size.

According to one embodiment, the second motion information is obtained by partitioning the current block into at least one subblock, and performing motion information refinement on the at least one subblock when at least one of a width and a height of the current block is equal to or greater than a predetermined block size.

According to one embodiment, the predetermined block size is 16.

According to one embodiment, initial motion information on the current block is used as initial motion information of the subblock.

According to one embodiment, the second motion information is obtained by using a pixel value indicated by a candidate motion vector in a region within an L0 reference picture for the current block, and using a pixel value indicated by a vector opposite to the candidate motion vector in a region within an L1 reference picture for the current block.

According to one embodiment, the first motion information on the current block is used for performing at least one of predicting a spatial motion vector of the neighboring block of the current block, and for determining a boundary strength of deblocking filtering.

According to one embodiment, the second motion information on the current block is used for predicting motion information on a col-block of the neighboring block of the current block.

Also, according to the present invention, there is provided an image encoding method comprising: determining whether or not to perform motion information refinement;

and encoding information on whether or not to perform motion information refinement on the basis of the determination.

According to one embodiment, the information on whether or not to perform motion information refinement is signaled through at least one of a parameter set or video parameter set, a sequence parameter set, a subpicture parameter set, a picture parameter set, an adaptation parameter set, a slice header, a tile header, and a brick header.

Also, according to the present invention, there is provided an image decoding apparatus, the apparatus decodes information on whether or not to perform motion information refinement from a bitstream; obtains second motion information for first motion information on a current block on the basis of the information; and reconstructs at least one of the current block and a neighboring block of the current block by using at least one of the first motion information and the second motion information.

According to one embodiment, the information on whether or not to perform motion information refinement is signaled through at least one of a parameter set or video parameter set, a sequence parameter set, a subpicture parameter set, a picture parameter set, an adaptation parameter set, a slice header, a tile header, and a brick header.

According to one embodiment, the first motion information is initial motion information on the current block, and the second motion information is information obtained by performing refinement on the first motion information.

According to one embodiment, the second motion information is obtained by partitioning the current block into at least one subblock, and performing motion information refinement on the at least one subblock when the current block is equal to or greater than a predetermined block size.

According to one embodiment, the second motion information is obtained by partitioning the current block into at least one subblock, and performing motion information refinement on the at least one subblock when at least one of a width and a height of the current block is equal to or greater than a predetermined block size.

According to one embodiment, the predetermined block size is 16.

According to one embodiment, initial motion information on the current block is used as initial motion information on the subblock.

Also, according to the present invention, there is provided a computer-readable non-transitory recording medium storing video data used in an image decoding method, wherein the image data includes information on whether or not to perform motion information refinement, and in the image decoding method, the information on whether or not to perform motion information refinement is used for obtaining second motion information for first motion information on a current block, and at least one of the first motion information and the second motion information is used for reconstructing at least one of the current block and a neighboring block of the current block.

Advantageous Effects

According to the present invention, there is provided an image encoding/decoding method and apparatus, whereby throughput is improved.

In addition, according to the present invention, there is provided a method and apparatus for minimizing dependency on a neighboring block and a current block so that encoding/decoding on the current block is performed before encoding/decoding on the neighboring block has completed, whereby throughput of the encoder/decoder is improved.

In addition, according to the present invention, there is provided a recording medium storing a bitstream generated by the image encoding/decoding method and apparatus of the present invention.

BEST MODE

Mode for Invention

Figure 1:
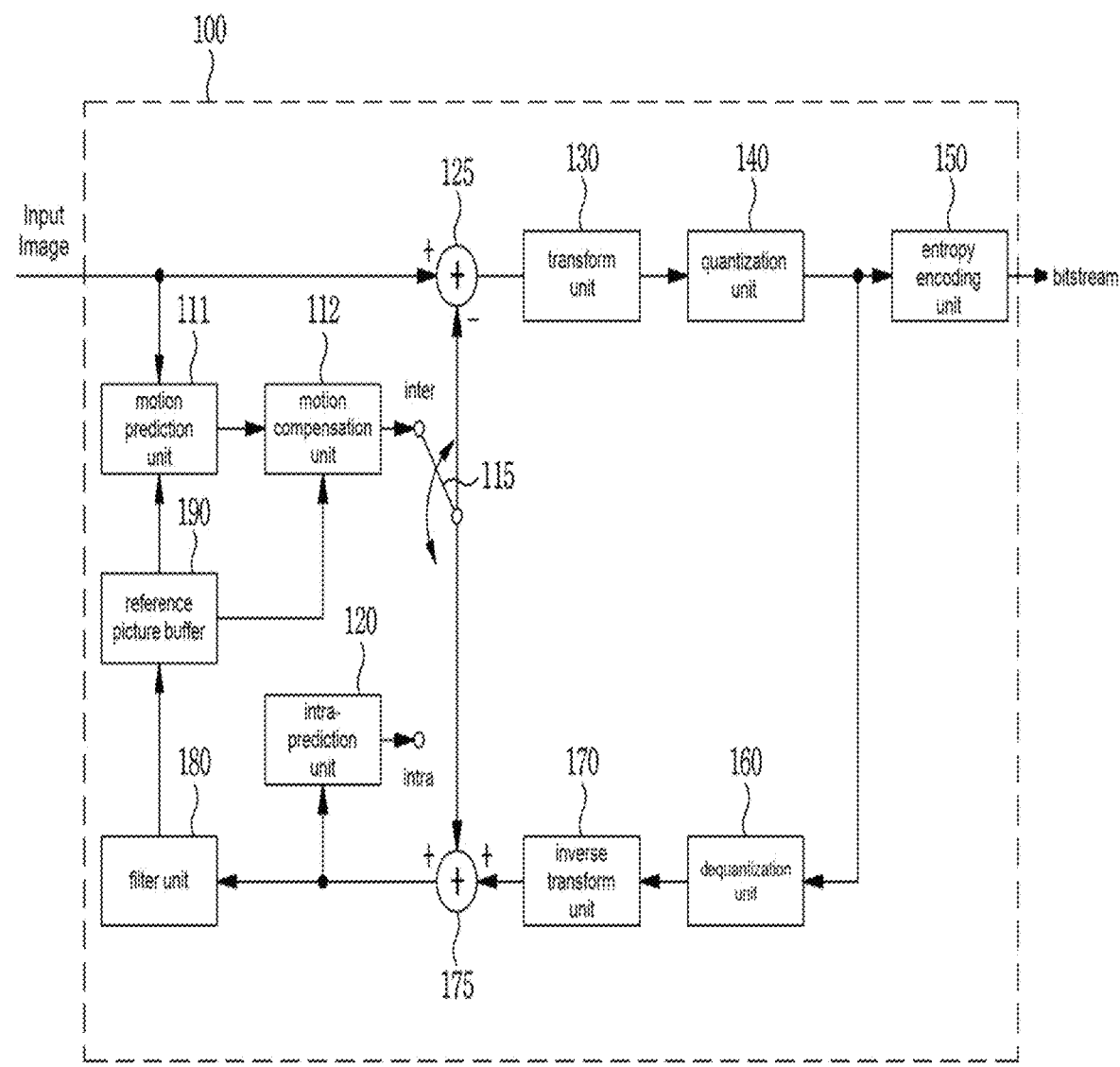
FIG. 1 is a view of a block diagram showing a configuration of an encoding apparatus to which the present invention is applied.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means a decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to 2Bd−1 according to a bit depth (Bd). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quarternary-tree.

When the size of the coding block is within a predetermined range, the division is possible using only quad-tree partitioning. Here, the predetermined range may be defined as at least one of a maximum size and a minimum size of a coding block in which the division is possible using only quad-tree partitioning. Information indicating a maximum/minimum size of a coding block in which quad-tree partitioning is allowed may be signaled through a bitstream, and the information may be signaled in at least one unit of a sequence, a picture parameter, a tile group, or a slice (segment). Alternatively, the maximum/minimum size of the coding block may be a fixed size predetermined in the coder/decoder. For example, when the size of the coding block corresponds to 256×256 to 64×64, the division is possible only using quad-tree partitioning. Alternatively, when the size of the coding block is larger than the size of the maximum conversion block, the division is possible only using quad-tree partitioning. Herein, the block to be divided may be at least one of a coding block and a transform block. In this case, information indicating the division of the coded block (for example, split flag) may be a flag indicating whether or not to perform the quad-tree partitioning. When the size of the coding block falls within a predetermined range, the division is possible only using binary tree or ternary tree partitioning. In this case, the above description of the quad-tree partitioning may be applied to binary tree partitioning or ternary tree partitioning in the same manner.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node (Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, a tile group header, and tile header information. The term "tile group" means a group of tiles and has the same meaning as a slice.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference picture list may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index may refer to an index indicating a specific reference picture in a reference picture list.

Reference picture may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range may be a two-dimensional region which is searched to retrieve a motion vector during inter prediction. For example, the size of the search range may be M×N. Here, M and N are both integers.

Motion vector candidate may refer to a prediction candidate block or a motion vector of the prediction candidate block when predicting a motion vector. In addition, a motion vector candidate may be included in a motion vector candidate list.

Motion vector candidate list may mean a list composed of one or more motion vector candidates.

Motion vector candidate index may mean an indicator indicating a motion vector candidate in a motion vector candidate list. Alternatively, it may be an index of a motion vector predictor.

Motion information may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list may mean a list composed of one or more merge candidates.

Merge candidate may mean a spatial merge candidate, a temporal merge candidate, a combined merge candidate, a combined bi-predictive merge candidate, or a zero merge candidate. The merge candidate may include motion information such as an inter prediction indicator, a reference picture index for each list, a motion vector, a prediction list utilization flag, and an inter prediction indicator.

Merge index may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one piece of motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a sum value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a difference of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary (first) transform is used, information of whether or not a secondary transform is used, a primary transform index, a secondary transform index, information of whether or not a residual signal is present, a coded block pattern, a coded block flag (CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, tile group identification information, a tile group type, tile group partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
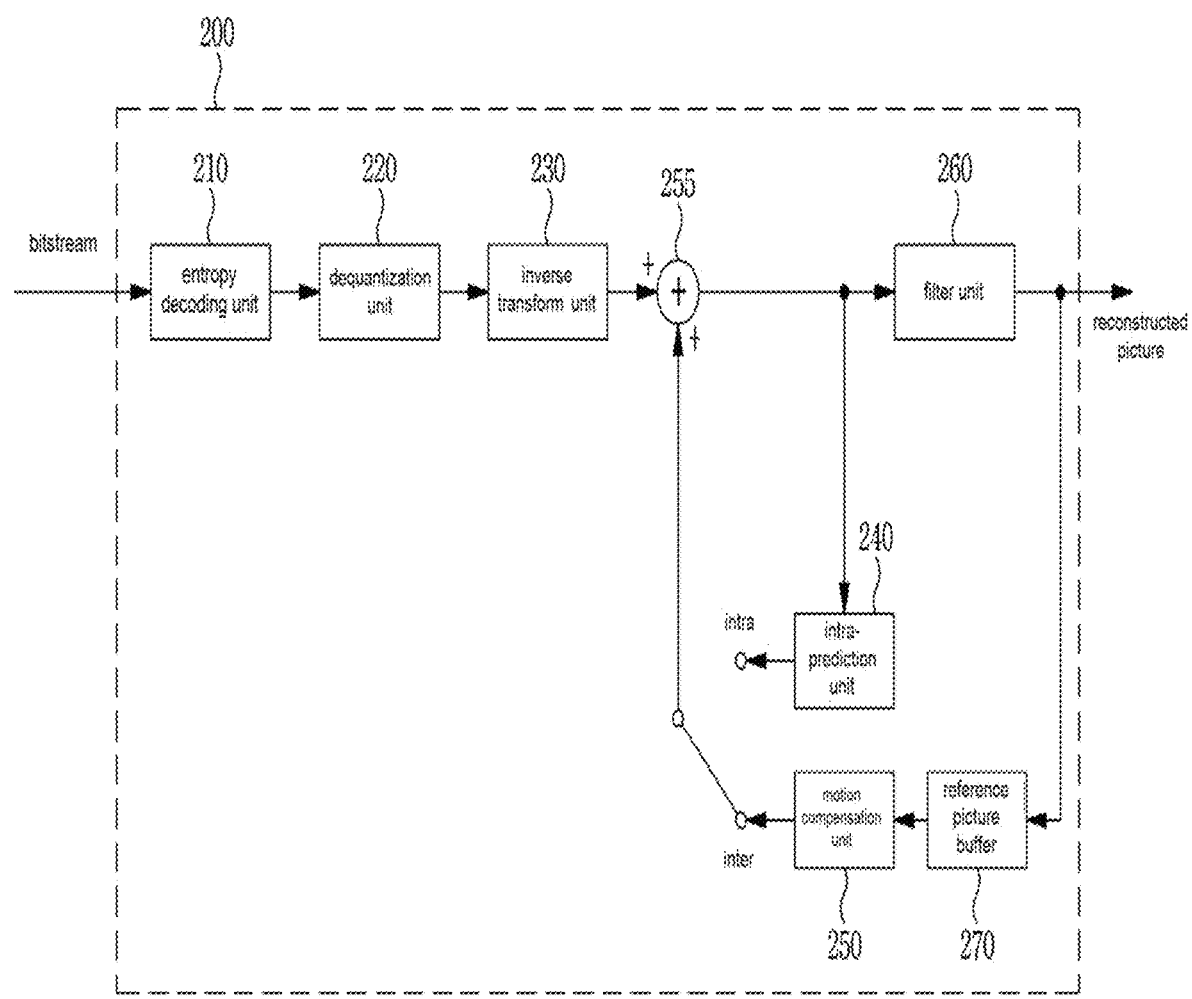
FIG. 2 is a view of a block diagram showing a configuration of a decoding apparatus to which the present invention is applied.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be an inverse-process of the entropy encoding method described above.

In order to decode a transform coefficient level (quantized level), the entropy decoding unit 210 may change a onedirectional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
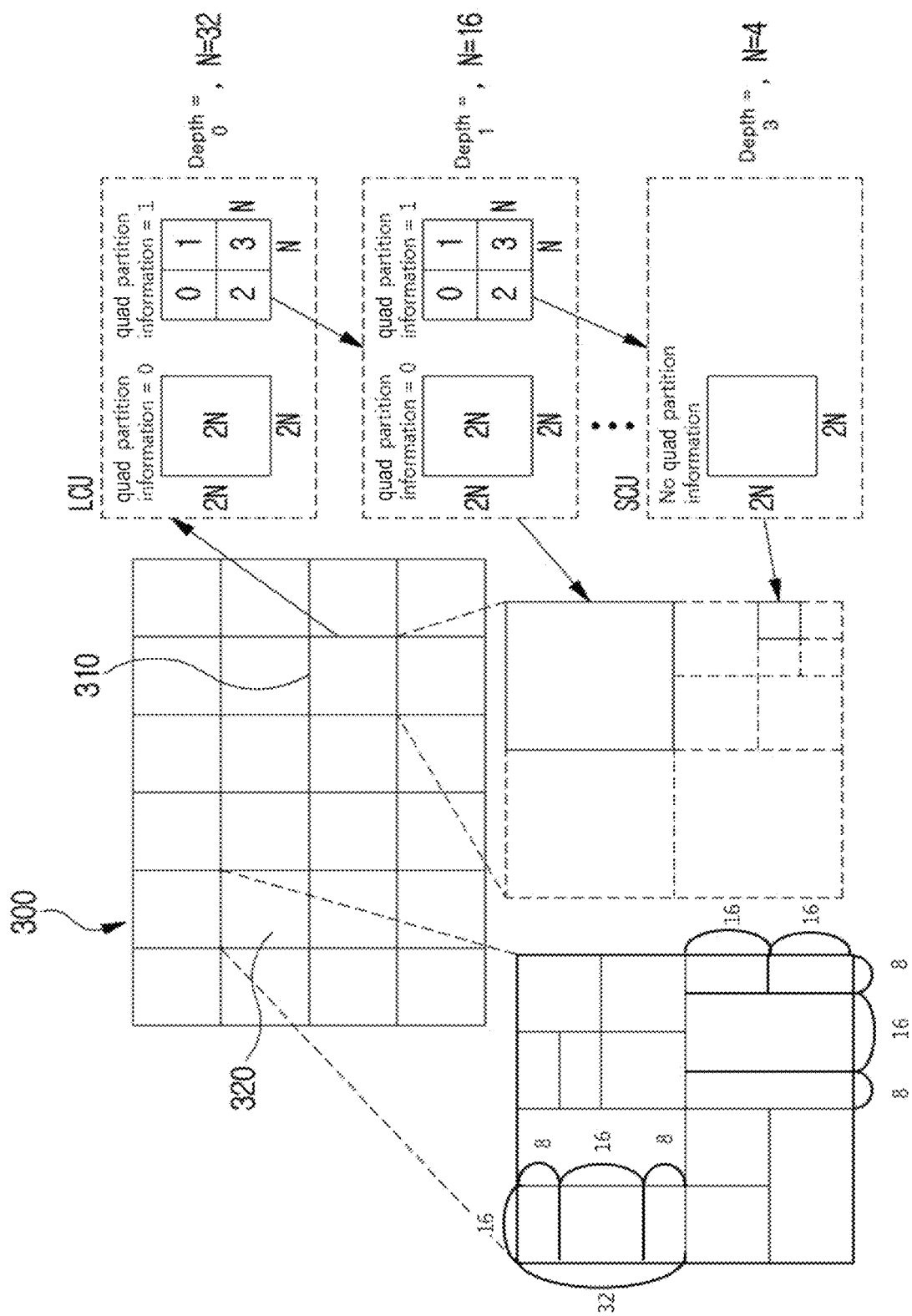
FIG. 3 is a view schematically showing a partition structure when encoding and decoding an image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and an LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (length) of the coding unit is larger than the vertical size (length) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, a tile group level, a tile level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, a tile group level, a tile level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, a tile group level, a tile level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, the binary tree partitioning or the ternary tree partitioning may be limited on the basis of the size of a virtual pipeline data unit (hereinafter, a pipeline buffer size). For example, when the coding unit is divided into sub-coding units which do not fit the pipeline buffer size by the binary tree partitioning or the ternary tree partitioning, the corresponding binary tree partitioning or ternary tree partitioning may be limited. The pipeline buffer size may be the size of the maximum transform block (e.g., 64×64). For example, when the pipeline buffer size is 64×64, the division below may be limited.

N×M (N and/or M is 128) Ternary tree partitioning for coding units

128×N (N<=64) Binary tree partitioning in horizontal direction for coding units

N×128 (N<=64) Binary tree partitioning in vertical direction for coding units

Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
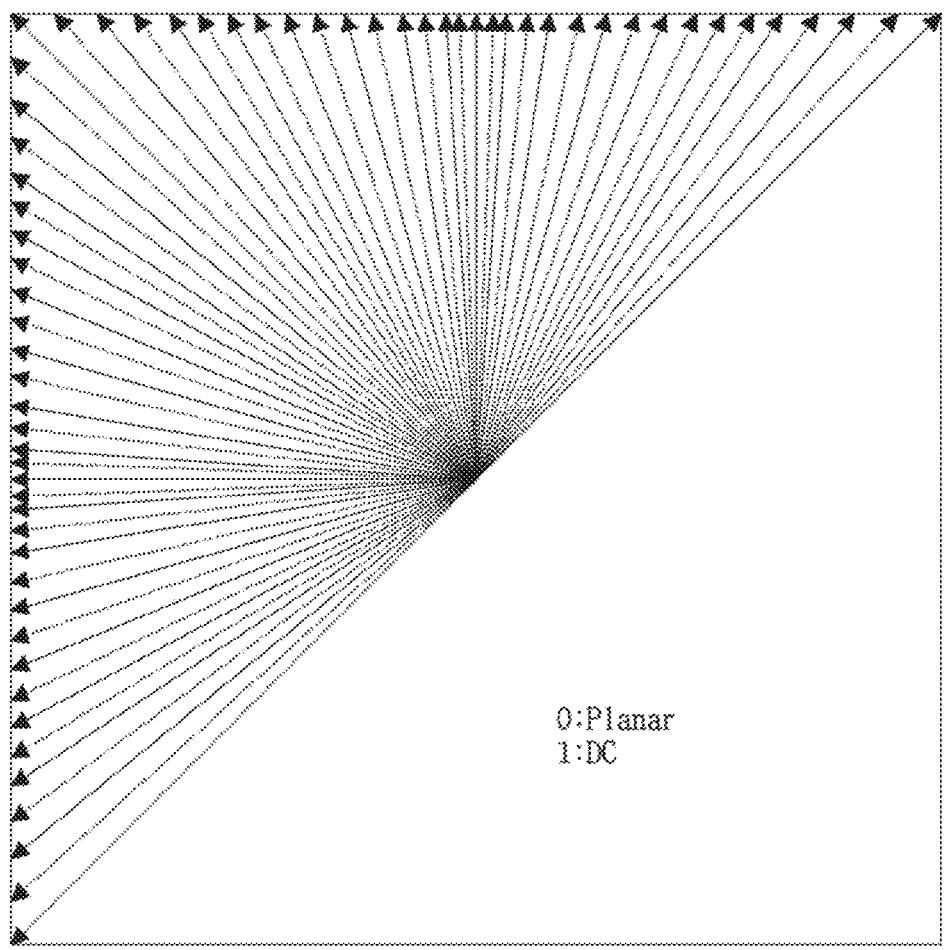
FIG. 4 is a view showing an example of intra-prediction.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using an encoding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode. In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

Figure 7:
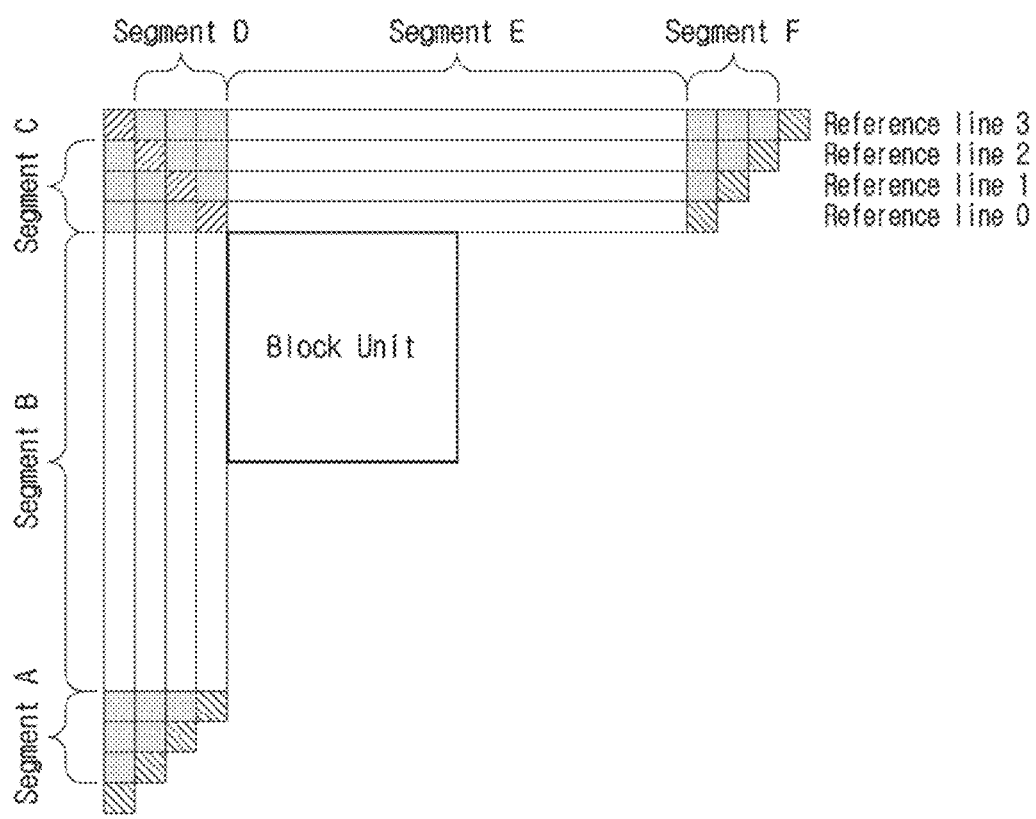
FIG. 7 is a view showing reference samples that are usable for intra-prediction.

FIG. 7 is a diagram illustrating reference samples capable of being used for intra prediction.

As shown in FIG. 7, at least one of the reference sample line 0 to the reference sample line 3 may be used for intra prediction of the current block. In FIG. 7, the samples of a segment A and a segment F may be padded with the samples closest to a segment B and a segment E, respectively, instead of retrieving from the reconstructed neighboring block. Index information indicating the reference sample line to be used for intra prediction of the current block may be signaled. When the upper boundary of the current block is the boundary of the CTU, only the reference sample line 0 may be available. Therefore, in this case, the index information may not be signaled. When a reference sample line other than the reference sample line 0 is used, filtering for a prediction block, which will be described later, may not be performed.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

In the case of intra prediction between color components, a prediction block for the current block of the second color component may be generated on the basis of the corresponding reconstructed block of the first color component. For example, the first color component may be a luma component, and the second color component may be a chroma component. For intra prediction between color components, the parameters of the linear model between the first color component and the second color component may be derived on the basis of the template. The template may include upper and/or left neighboring samples of the current block and upper and/or left neighboring samples of the reconstructed block of the first color component corresponding thereto. For example, the parameters of the linear model may be derived using a sample value of a first color component having a maximum value among samples in a template and a sample value of a second color component corresponding thereto, and a sample value of a first color component having a minimum value among samples in the template and a sample value of a second color component corresponding thereto. When the parameters of the linear model are derived, a corresponding reconstructed block may be applied to the linear model to generate a prediction block for the current block. According to a video format, subsampling may be performed on the neighboring samples of the reconstructed block of the first color component and the corresponding reconstructed block. For example, when one sample of the second color component corresponds to four samples of the first color component, four samples of the first color component may be sub-sampled to compute one corresponding sample. In this case, the parameter derivation of the linear model and intra prediction between color components may be performed on the basis of the corresponding sub-sampled samples. Whether or not to perform intra prediction between color components and/or the range of the template may be signaled as the intra prediction mode.

The current block may be partitioned into two or four sub-blocks in the horizontal or vertical direction. The partitioned sub-blocks may be sequentially reconstructed. That is, the intra prediction may be performed on the sub-block to generate the sub-prediction block. In addition, dequantization and/or inverse transform may be performed on the sub-blocks to generate sub-residual blocks. A reconstructed sub-block may be generated by adding the sub-prediction block to the sub-residual block. The reconstructed sub-block may be used as a reference sample for intra prediction of the sub-sub-blocks. The sub-block may be a block including a predetermined number (for example, 16) or more samples. Accordingly, for example, when the current block is an 8×4 block or a 4×8 block, the current block may be partitioned into two sub-blocks. Also, when the current block is a 4×4 block, the current block may not be partitioned into sub-blocks. When the current block has other sizes, the current block may be partitioned into four sub-blocks. Information on whether or not to perform the intra prediction based on the sub-blocks and/or the partitioning direction (horizontal or vertical) may be signaled. The intra prediction based on the sub-blocks may be limited to be performed only when reference sample line 0 is used. When the intra prediction based on the sub-block is performed, filtering for the prediction block, which will be described later, may not be performed.

The final prediction block may be generated by performing filtering on the prediction block that is intra-predicted. The filtering may be performed by applying predetermined weights to the filtering target sample, the left reference sample, the upper reference sample, and/or the upper left reference sample. The weight and/or the reference sample (range, position, etc.) used for the filtering may be determined on the basis of at least one of a block size, an intra prediction mode, and a position of the filtering target sample in the prediction block. The filtering may be performed only in the case of a predetermined intra prediction mode (e.g., DC, planar, vertical, horizontal, diagonal, and/or adjacent diagonal modes). The adjacent diagonal mode may be a mode in which k is added to or subtracted from the diagonal mode. For example, k may be a positive integer of 8 or less.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
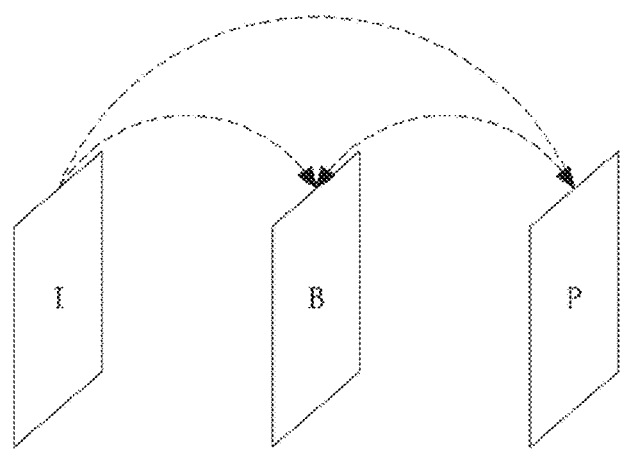
FIG. 5 is a view showing an example of inter-prediction.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are predefined in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

The derivation method of the motion information may be different depending on the prediction mode of the current block. For example, a prediction mode applied for inter prediction includes an AMVP mode, a merge mode, a skip mode, a merge mode with a motion vector difference, a subblock merge mode, a triangle partition mode, an inter-intra combination prediction mode, affine mode, and the like. Herein, the merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

Meanwhile, the coding apparatus 100 may perform entropy-coding on resolution information of the calculated MVD. The decoding apparatus 200 may adjust the resolution of the entropy-decoded MVD using the MVD resolution information.

Meanwhile, the coding apparatus 100 calculates a motion vector difference (MVD) between a motion vector and a motion vector candidate in the current block on the basis of an affine model, and performs entropy-coding on the MVD. The decoding apparatus 200 derives a motion vector on a per sub-block basis by deriving an affine control motion vector of a decoding target block through the sum of the entropy-decoded MVD and an affine control motion vector candidate.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least one of motion information (spatial merge candidate) of a neighboring block adjacent to the current block, motion information (temporal merge candidate) of the collocated block of the current block in the reference picture, new motion information generated by a combination of the motion information exiting in the merge candidate list, motion information (history-based merge candidate) of the block that is encoded/decoded before the current block, and zero merge candidate.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left side of the current block, an upper neighboring block disposed above the current block, and a temporal neighboring block temporally adjacent to the current block.

Meanwhile, the coding apparatus 100 performs entropy-coding on the correction information for correcting the motion vector among the motion information of the merge candidate and signals the same to the decoding apparatus 200. The decoding apparatus 200 can correct the motion vector of the merge candidate selected by the merge index on the basis of the correction information. Here, the correction information may include at least one of information on whether or not to perform the correction, correction direction information, and correction size information. As described above, the prediction mode that corrects the motion vector of the merge candidate on the basis of the signaled correction information may be referred to as a merge mode having the motion vector difference.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The subblock merge mode may mean a mode that derives the motion information in units of sub-blocks of a coding block (CU). When the subblock merge mode is applied, a subblock merge candidate list may be generated using motion information (sub-block based temporal merge candidate) of the sub-block collocated to the current sub-block in the reference image and/or an affine control point motion vector merge candidate.

The triangle partition mode may mean a mode that derives motion information by partitioning the current block into diagonal directions, derives each prediction sample using each of the derived motion information, and derives the prediction sample of the current block by weighting each of the derived prediction samples.

The inter-intra combined prediction mode may mean a mode that derives a prediction sample of the current block by weighting a prediction sample generated by inter prediction and a prediction sample generated by intra prediction.

The decoding apparatus 200 may correct the derived motion information by itself. The decoding apparatus 200 may search the predetermined region on the basis of the reference block indicated by the derived motion information and derive the motion information having the minimum SAD as the corrected motion information.

The decoding apparatus 200 may compensate a prediction sample derived via inter prediction using an optical flow.

Figure 6:
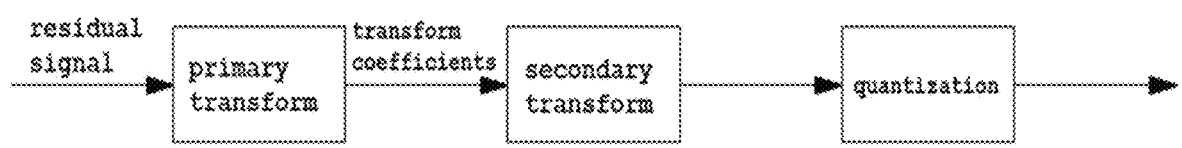
FIG. 6 is a view showing an example of transform and quantization.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e., an intra prediction block or an inter prediction block). The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Karhunen-Loéve transform (KLT). The transform coefficients generated through the primary transform may undergo the secondary transform. The transform schemes used for the primary transform and/or the secondary transform may be determined according to coding parameters of the current block and/or neighboring blocks of the current block. Alternatively, transform information indicating the transform scheme may be signaled. The DCT-based transform may include, for example, DCT-2, DCT-8, and the like. The DST-based transform may include, for example, DST-7.

A quantized-level signal (quantization coefficients) may be generated by performing quantization on the residual signal or a result of performing the primary transform and/or the secondary transform. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block form change into a one-dimensional vector form. Aside from the diagonal up-right scan, the horizontal scan of horizontally scanning a two-dimensional block form of coefficients or the vertical scan of vertically scanning a two-dimensional block form of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block form through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

Inverse mapping in a dynamic range may be performed for a luma component reconstructed through intra prediction or inter prediction before in-loop filtering. The dynamic range may be divided into 16 equal pieces and the mapping function for each piece may be signaled. The mapping function may be signaled at a slice level or a tile group level. An inverse mapping function for performing the inverse mapping may be derived on the basis of the mapping function. In-loop filtering, reference picture storage, and motion compensation are performed in an inverse mapped region, and a prediction block generated through inter prediction is converted into a mapped region via mapping using the mapping function, and then used for generating the reconstructed block. However, since the intra prediction is performed in the mapped region, the prediction block generated via the intra prediction may be used for generating the reconstructed block without mapping/inverse mapping.

When the current block is a residual block of a chroma component, the residual block may be converted into an inverse mapped region by performing scaling on the chroma component of the mapped region. The availability of the scaling may be signaled at the slice level or the tile group level. The scaling may be applied only when the mapping for the luma component is available and the division of the luma component and the division of the chroma component follow the same tree structure. The scaling may be performed on the basis of an average of sample values of a luma prediction block corresponding to the color difference block. In this case, when the current block uses inter prediction, the luma prediction block may mean a mapped luma prediction block. A value necessary for the scaling may be derived by referring to a lookup table using an index of a piece to which an average of sample values of a luma prediction block belongs. Finally, by scaling the residual block using the derived value, the residual block may be switched to the inverse mapped region. Then, chroma component block restoration, intra prediction, inter prediction, in-loop filtering, and reference picture storage may be performed in the inverse mapped area.

Information indicating whether the mapping/inverse mapping of the luma component and chroma component is available may be signaled through a set of sequence parameters.

The prediction block of the current block may be generated on the basis of a block vector indicating a displacement between the current block and the reference block in the current picture. In this way, a prediction mode for generating a prediction block with reference to the current picture is referred to as an intra block copy (IBC) mode. The IBC mode may be applied to M×N (M<=64, N<=64) coding units. The IBC mode may include a skip mode, a merge mode, an AMVP mode, and the like. In the case of a skip mode or a merge mode, a merge candidate list is constructed, and the merge index is signaled so that one merge candidate may be specified. The block vector of the specified merge candidate may be used as a block vector of the current block. The merge candidate list may include at least one of a spatial candidate, a history-based candidate, a candidate based on an average of two candidates, and a zero-merge candidate. In the case of an AMVP mode, the difference block vector may be signaled. In addition, the prediction block vector may be derived from the left neighboring block and the upper neighboring block of the current block. The index on which neighboring block to use may be signaled. The prediction block in the IBC mode is included in the current CTU or the left CTU and limited to a block in the already reconstructed area. For example, a value of the block vector may be limited such that the prediction block of the current block is positioned in an area of three 64×64 blocks preceding the 64×64 block to which the current block belongs in the coding/decoding order. By limiting the value of the block vector in this way, memory consumption and device complexity according to the IBC mode implementation may be reduced.

The present invention relates to an image encoding/decoding method and apparatus on a per block basis, and a recording medium storing a bitstream, and image encoding/decoding may be performed according to at least one of embodiments that will be described hereinafter.

An image encoding/decoding method and apparatus, and a recording medium storing a bitstream of the present disclosure may encode/decode multiple blocks in parallel, or encode/decode a current block before encoding/decoding on a neighboring block has completed.

Herein, encoding/decoding may mean at least one of intra-prediction, inter-prediction, motion compensation, transform, inverse transform, quantization, dequantization, entropy encoding/decoding, deblocking filtering, adaptive sample offset, and filtering in-loop filtering. In addition, the encoding/decoding may mean a process of encoding/decoding.

In addition, in an example of the present invention which will be described later, a block or CU (coding unit) may be configured with a luma pixel of an M×N size within a current picture and a corresponding chroma pixel being equal to or smaller than the M×N size, and may be a unit, in the encoder/decoder, of performing an intra or inter-prediction method, of predicting a motion vector predict, transform and quantization, and entropy encoding/decoding.

In an example which will be described later, a block or CU is described on the basis of a luma block, and the present invention may be applied to a chroma block similarly.

In examples which will be described later, an embodiment of partial piece of information on a block is shown, but it is not limited thereto. At least one of a particular embodiment of at least one piece of information on a block, and a combination of embodiments may be applied to at least one of encoding/decoding on a current block.

In addition, in an example which will be described later, various examples of partial piece of information on a block are shown among information on a block, but it is not limited thereto. Among the information on the block, a particular embodiment of at least one piece of information on a block, and a combination of embodiments may be applied to at least one of encoding/decoding on a current block.

The information on the block may mean at least one of information on a neighboring block, information on a reference block, and information on a current block.

In addition, the information on the block may include at least one coding parameter. In addition, the information on the block may include at least one piece of information used for inter-prediction, intra-prediction, transform, inverse transform, quantization, dequantization, entropy encode/decode, and in-loop filtering. In other words, the information on the block may mean at least one value or a combination of a block size, a block depth, block partition information, block shape (square or non-square), whether or not partition of a quad-tree form is performed, whether or not partition of a binary-tree form is performed, a partition direction of the binary-tree form (horizontal direction or vertical direction), a partition shape of the binary-tree form (symmetrical or asymmetrical partition), a prediction mode (intra-prediction or inter-prediction), intra luma prediction mode/angle, intra chroma prediction mode/angle, intra partition information, inter partition information, a coding block partition flag, a prediction block partition flag, a transform block partition flag, a reference sample filter tap, a reference sample filter coefficient, a predict block filter tap, a prediction block filter coefficient, a prediction block boundary filter tap, a prediction block boundary filter coefficient, a motion vector (motion vector of at least one of L0, L1, L2, L3, etc.), a motion vector difference (a motion vector difference of at least one of L0, L1, L2, L3, etc.), an inter-prediction angle (inter-prediction angle of at least one of uni-prediction and biprediction), a reference image index (reference image index of at least one of L0, L1, L2, L3, etc.), an inter-prediction indicator, a prediction flag utilization flag, a reference image list, a motion vector prediction index, a motion vector prediction candidate, a motion vector candidate list, whether or not a merge mode is used, a merge candidate, a merge candidate, a merge candidate list, whether or not a skip mode is used, an interpolation filter type, an interpolation filter tap, an interpolation filter coefficient, a size of a motion vector, a motion vector representation accuracy (motion vector representation unit such as integer sample, ½ sample, ¼ sample, ⅛ sample, 1/16 sample, 1/32 sample, etc.), a transform type, a transform size, information on whether or not primary transform is used, information on whether or not secondary transform is used, a primary transform index, a secondary transform index, information on whether or not a residual signal is present, a coding block pattern, a coding block flag, a quantization parameter, a residual quantization parameter, a quantization matrix, whether or not an intra loop filter is applied, an intra loop filter coefficient, an intra loop filter tap, an intra loop filter figure/shape, whether or not a deblocking filter is applied, a deblocking filter coefficient, a deblocking filter tap, a deblocking filter strength, a deblocking filter figure/shape, whether or not adaptive sample offset is applied, an adaptive sample offset value, an adaptive sample offset category, an adaptive sample offset type, whether or not an adaptive loop filter is applied, an adaptive loop filter coefficient, an adaptive loop filter tap, an adaptive loop filter figure/shape, a binarization/debinarization method, a context model determining method, a context model update method, whether or not a regular mode is performed, whether or not b bypass mode is performed, a context bin, a bypass bin, a significant coefficient flag, a last significant coefficient flag, a coefficient group unit coding flag, a last significant coefficient position, a flag on whether or not a coefficient value is greater than 1, a flag on whether or not a coefficient value is greater than 2, a flag on whether or not a coefficient value is greater than 3, information on a residual coefficient value, sign information, a reconstructed luma sample, reconstructed chroma sample, a residual luma sample, a residual chroma sample, a luma transform coefficient, a chroma transform coefficient, a luma quantization level, a chroma quantization level, a transform coefficient scanning method, a size of a decoder-side search region for a motion vector, a shape of a decoder-side search region for a motion vector, a number of decoder-side searching times for a motion vector, information on a CTU size, information on a minimum block size, information on a maximum block size, information on a maximum block depth, information on a minimum block depth, slice identification information, slice partition information, tile identification information, a tile type, tile partition information, an input sample bit depth, a reconstructed sample bit depth, a residual sample bit depth, a transform coefficient bit depth, and a quantization level bit depth.

Figure 8:
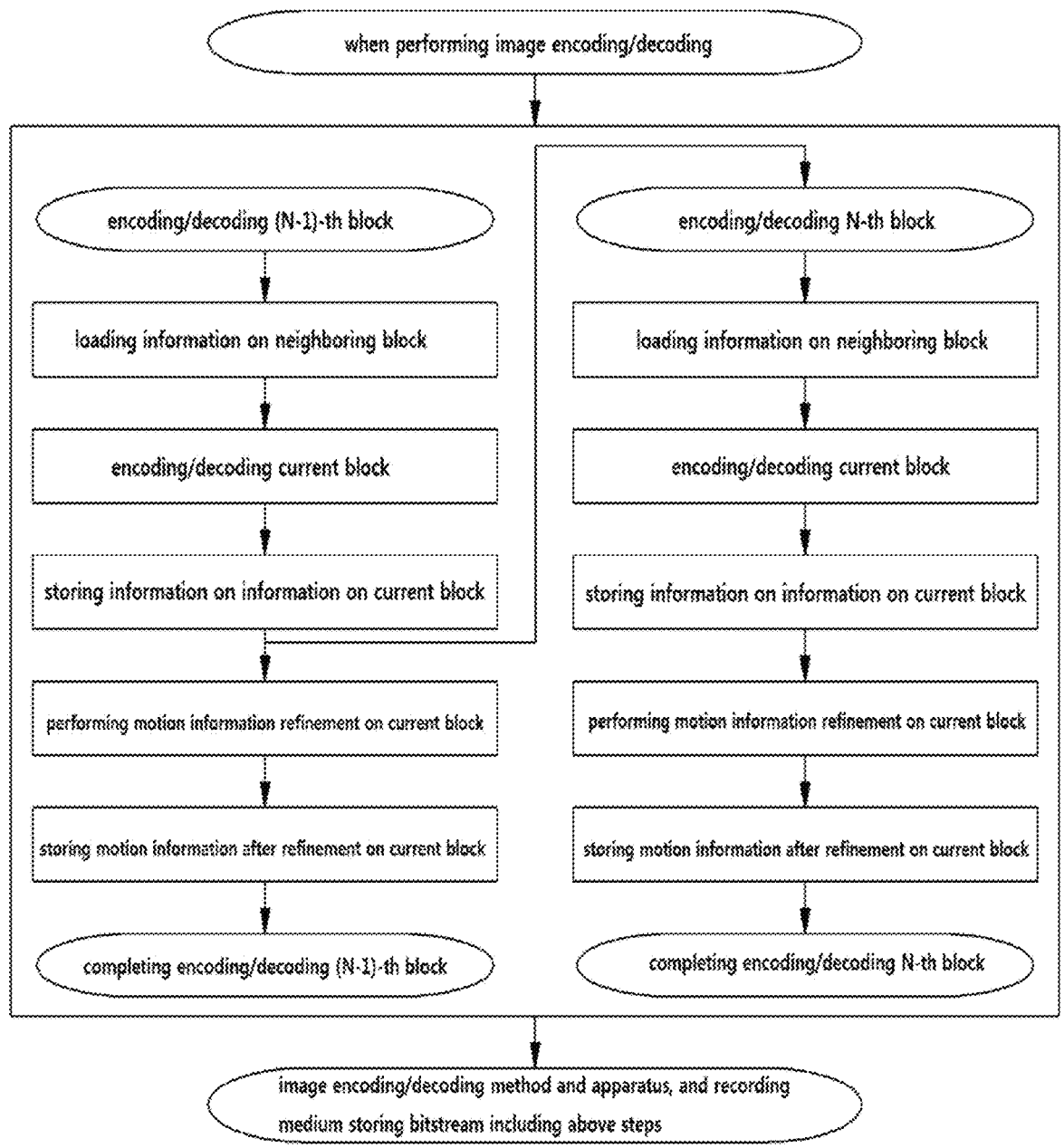
FIG. 8 is a view of a flowchart showing an image encoding/decoding method and apparatus, and a recording medium storing a bitstream according to an embodiment of the resent invention.

FIG. 8 is a view of a flowchart showing an image encoding/decoding method and apparatus, and a recording medium storing a bitstream according to an embodiment of the resent invention.

An image encoding/decoding method and apparatus of the present disclosure may perform: loading information on a neighboring block, encoding/decoding a current block; storing motion information on the current block; performing motion information refinement on the current block; and/or storing motion information on the current block after refinement.

Hereinafter, loading information on a neighboring block will be described.

The image encoding/decoding method and apparatus of the present disclosure may load information on a neighboring block. The loaded information on the neighboring block may be used for inter-prediction, intra-prediction, transform, motion information prediction, inverse transform, quantization, dequantization, entropy encoding/decoding, deblocking, in-loop filtering, etc. among encoding/decoding the current block.

Hereinafter, encoding/decoding a current block will be described.

The image encoding/decoding method and apparatus of the present disclosure may encode/decode the current block. Herein, at least one of encoding/decoding steps may be performed on the current block by using the information on the neighboring block. Herein, encoding/decoding the current block may include at least one of inter-prediction, intra-prediction, transform, motion information prediction, inverse transform, quantization, dequantization, entropy encoding/decoding, deblocking, and in-loop filtering of the current block.

When performing motion information prediction on the current block, motion information on a neighboring block may be used by being regarded as motion information before refinement (non-refined motion information), or a fixed value predefined in the encoder/decoder, or as motion information derived by the encoder/decoder in a predefined manner.

Herein, motion information prediction may mean at least one of steps used for encoding/decoding the current block by using motion information on a spatially or temporally adjacent position on which encoding/decoding has completed, such as motion vector prediction, merge candidate list generation, motion vector candidate list generation, etc.

In addition, the neighboring block may mean a block including motion information that may be used for motion information prediction by using a position predefined in the encoder/decoder, or by using a method predefined in the encoder/decoder.

In addition, fixed motion information predefined in the encoder/decoder may be defined as a vector of (0,0), or a scaled vector at a position in association with a time, or as non-usable motion information.

In an example, when a method of motion information refinement is used for a neighboring block or current block, motion information on the neighboring block may be used for motion information prediction by using motion information before refinement. In other words, the motion information on the neighboring block may be used for motion information prediction of the current block by being determined as motion information before refinement.

At least one of methods of performing motion information refinement may mean a method of deriving new motion information by using spatially adjacent pixels that have been already reconstructed by the decoder, temporally adjacent pixels included in a reference picture, or by using decoded multiple pieces of motion information, and generating reconstructed pixels by using the derived motion information. Herein, at least one piece of new motion information may be derived by performing partition into subblocks by using the decoded motion information.

Figure 9A:
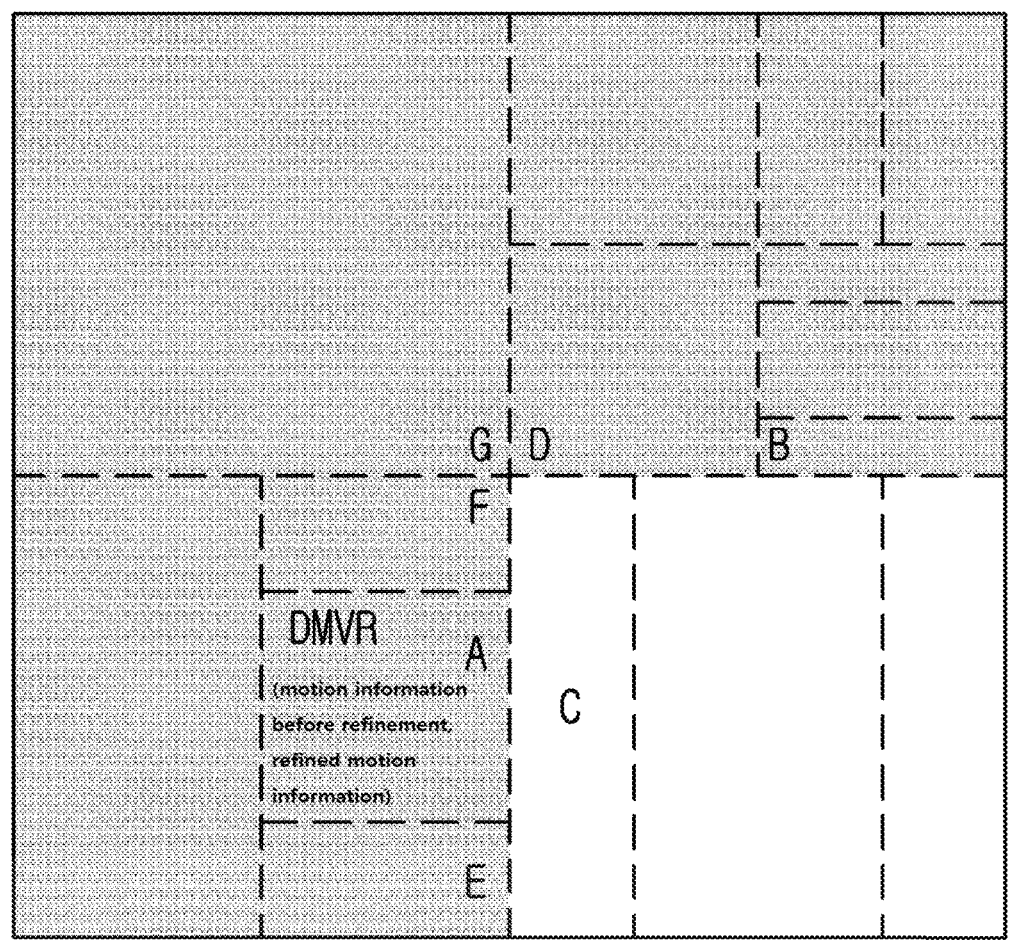
FIG. 9a is a view of showing prediction of motion information on a current block according to an embodiment of the present invention.

FIG. 9a is a view of showing prediction of motion information on a current block according to an embodiment of the present invention.

Referring to FIG. 9a, even though DMVR (decoder side motion vector refinement) is performed on a neighboring block A, motion information prediction on a current block C may be performed by using motion information (or non-refined motion information) on the neighboring block which is stored before performing DMVR and/or motion information (or refined motion information) after refinement. The DMVR is an example of motion information refinement, and means a mode that refines the derived motion information autonomously.

In an example, when a position of a neighboring block is included in a predetermined unit identical to a current block, motion information on the neighboring block may be used for motion information prediction on the current block by being regarded as motion information before refinement, fixed motion information predefined in the encoder/decoder, or as non-usable motion information.

Herein, the predetermined unit may be a predetermined size predefined in the encoder/decoder, or may be a size where a size of the unit is signaled through a header or parameter set. In addition, the predetermined unit may be at least one of a picture, a subpicture, a brick, a tile group, a tile, a slice, and a slice segment.

The picture may be partitioned into at least one row of tiles, and at least one column of tiles.

The picture may be partitioned into at least one subpicture configured with at least one row of tiles and at least one column of tiles. The subpicture is a region having a square or non-square shape within the picture, and may include at least one CTU. In addition, at least one tile/brick/slice may be included within one subpicture.

The tile is a region having a square or non-square shape within the picture, and may include at least one CTU. In addition, the tile may be partitioned into at least one brick.

The brick may mean at least one row of CTUs within the tile. The tile may be partitioned into at least one brick, and each brick may include at least one row of CTUs. The tile that is not partitioned into at least two pieces may mean a brick.

The slice may include at least one tile within a picture, and at least one brick may be included within the tile.

In another example, when a position of a neighboring block is included within a prediction region or transform region which is identical to a current block, or in the same CTU region, motion information on the neighboring block may be used for motion information prediction on the current block by being regarded as motion information before refinement, fixed motion information predefined in the encoder/decoder, or as non-usable motion information.

In another example, when a position of a neighboring block is included in a row of CTUs which is identical to a current block, motion information on the neighboring block be used for motion information prediction on the current block by being regarded as motion information before refinement, fixed motion information predefined in the encoder/decoder, or as non-usable motion information.

In another example, when a position of a neighboring block corresponds to an upper side adjacent to a current block, motion information on the neighboring block may be used for motion information prediction on the current block by being regarded as motion information before refinement, fixed motion information predefined in the encoder/decoder, or as non-usable motion information.

In another example, when a position of a neighboring block corresponds to a left side adjacent to a current block, motion information on the neighboring block may be used for motion information prediction on the current block by being regarded as motion information before refinement, fixed motion information predefined in the encoder/decoder, or as non-usable motion information.

In another example, when a position of a neighboring block corresponds to a just previous block in an encoding/decoding order and adjacent to a current block, motion information on the neighboring block may be used for motion information prediction on the current block by being regarded as motion information before refinement, fixed motion information predefined in the encoder/decoder, or as non-usable motion information.

In another example, when a position of a neighboring block is included in a maximum CU size identical to a size of the current block, a maximum prediction region, a maximum transform region, or a pipeline buffer size identically predefined in the encoder/decoder, motion information on the neighboring block by be used for motion information prediction on the current block by being regarded as motion information before refinement, fixed motion information predefined in the encoder/decoder, or as non-usable motion information.

In another example, when a position of a neighboring block is included in a parent node identical to a current block within a block tree structure, motion information on the neighboring block may be used for motion information prediction on the current block by being regarded as motion information before refinement, fixed motion information predefined in the encoder/decoder, or as non-usable motion information.

When performing motion information prediction on a current block, among motion information on a neighboring block, motion information before refinement or motion information after refinement may be selectively used for encoding/decoding the current block according to the use. In addition, both of motion information before refinement and motion information after refinement may be used for encoding/decoding the current block, or information obtained by combining thereof may be used for encoding/decoding the current block.

In an example, when motion information prediction on a current block is performed by using motion information on a block within a spatially corresponding base layer or lower layer where a scalability is used, motion information before refinement is selectively scaled and the result is used for motion information prediction on the current block, or motion information after refinement is scaled and the result is used for motion information prediction of the current block. Herein, which piece of motion information is to be used may be signaled by being included in a parameter set or header information (VPS, SPS, PPS, slice header, tile header, etc.).

In another example, when OBMC (overlapped block motion compensation) is used for a current block, and whether or not motion information on a neighboring block is identical to motion information on a current block is determined, motion information after refinement on the neighboring block may be used for encoding/decoding the current block. By using the same, whether or not to perform additional motion compensation or OBMC on the current block may be determined. Herein, which piece of motion information is to be used may be signaled by being included in a parameter set or header information (VPS, SPS, PPS, slice header, tile header, etc.).

When performing motion information prediction on a current block, motion information before refinement on a neighboring block included in a specific region may be used, or motion information after refinement on the neighboring block included in the specific region may be selectively used. Herein, in order to determine whether motion information before refinement or motion information after refinement is used for the current block, the same by determined by using a flag representing which piece of information among information stored in an internal memory, an external memory or in a line buffer, or by using mode information representing that the neighboring block is a block on which motion information refinement is performed, and the determined information is used for motion information prediction on the current block.

Figure 9B:
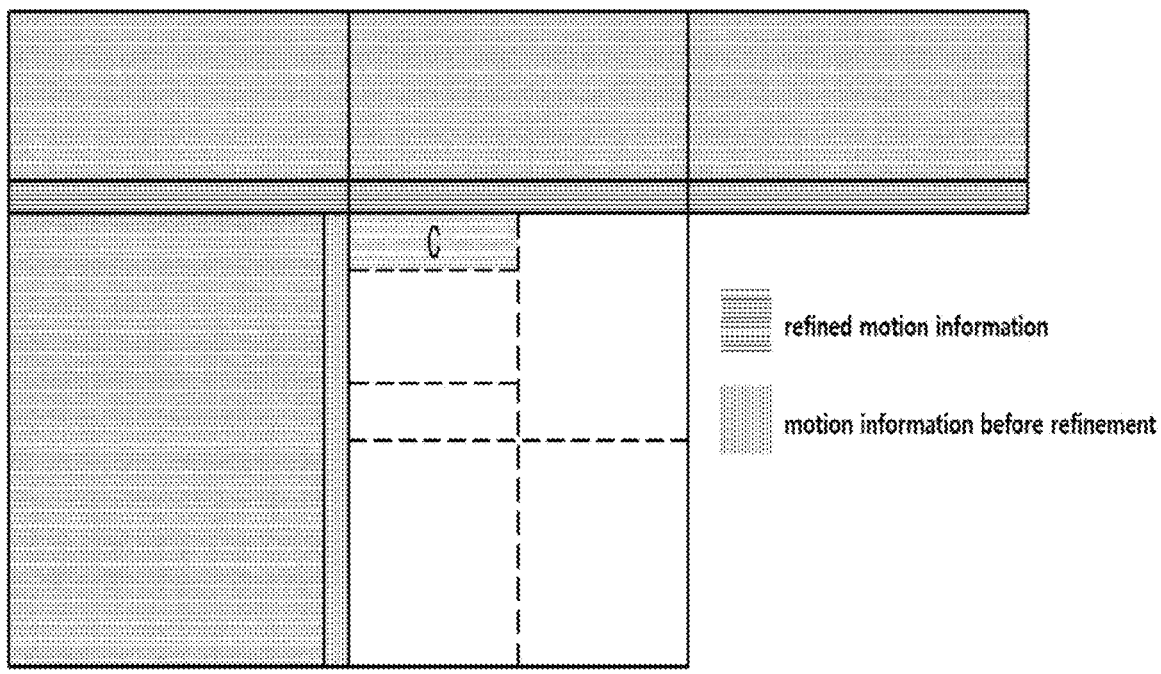
FIG. 9b is a view of showing prediction of motion information on a current block according to another embodiment of the present invention.

In an example, FIG. 9b is a view showing another example of the present invention and which shows motion information prediction on a current block. As shown in the example of FIG. 9b, when performing motion information prediction on a current block C, motion information on an upper neighboring block is included in the line buffer, and thus motion information after refinement may be used, and motion information on a left block is included in the internal memory, and thus motion information before refinement may be selectively used.

In another example, whether motion information before refinement or motion information after refinement is used may be determined according to a predefined region. In an example, for motion information on an upper neighboring block, motion information after refinement may be set to be used for encoding/decoding a current block, and for motion information on a left block, motion information before refinement may be set to be used for encoding/decoding the current block. Herein, a flag representing which piece of information is to be used among information stored in the internal memory, the external memory, or in the line buffer may not be signaled.

When performing motion information prediction on a current block, and performing spatial motion information prediction, even when motion information prediction is performed by using motion information before refinement, temporal motion information on the current block may be derived by using motion information after refinement when performing temporal motion information prediction. Accordingly, within a motion information list predicted for the current block, motion information before refinement and motion information after refinement may be present.

In an example, when generating a motion vector candidate list or generating a merge candidate list, and a maximum number of motion vector candidates or merge candidates is N, temporal motion information may be generated by taking into account a time difference of motion information at a specific position of a previously encoded/decoded picture by performing temporal motion information prediction when a number pieces of usable motion information is less than N while the list is configured by using motion information before refinement through spatial motion information prediction. Herein, for the motion information on the specific position of the previous picture, motion information after refinement may be used. Accordingly, the finally derived predicted temporal motion information may mean motion information after refinement. Herein, N may be a positive integer.

In another example, when generating a motion vector candidate list or generating a merge candidate list, even when scaled temporal motion information or additional merge candidate is derived, motion information after refinement may be used.

When entropy encoding/decoding one picture, and statistical information is derived, from previously encoded/decoded information, by using motion information such as motion information or motion vector difference, motion information after refinement or motion information before refinement may be selectively used or both of the information may be used. Herein, which method is to be used may be signaled by being included in a parameter set or header information (VPS, SPS, PPS, slice header, tile header, etc.). Alternatively, information obtained by combining motion information after refinement and motion information before refinement may be used.

In an example, a magnitude of an absolute value of a motion vector included in motion information before refinement and a motion vector included in motion information after refinement may be regarded as a motion vector residual value, and the same may be used for calculating statistical information. The derived statistical information may be used for entropy encoding/decoding a current picture, deriving global motion information, deriving motion within an object, etc.

In another example, statistical information on a motion vector may be calculated by only using motion information before refinement or motion information after refinement. The derived statistical information may be used for entropy encoding/decoding a current picture, deriving global motion information, deriving motion within an object, etc.

In another example, motion information before refinement or motion information after refinement may be used for transcoding.

When encoding/decoding a current block, motion information before refinement and/or after refinement on a neighboring block adjacent to a current block may be used.

In an example, in at least one of inter-prediction, motion compensation, transform, inverse transform, quantization, dequantization, entropy encoding/decoding, deblocking filtering, adaptive sample offset, and adaptive in-loop filtering of a current block, motion information before refinement on a neighboring block adjacent to the current block may be used.

For example, a spatial motion vector may be predicted by using motion information before refinement on a neighboring block adjacent to a current block. Alternatively, a boundary strength in deblocking filtering may be determined by using motion information before refinement on a neighboring block adjacent to a current block.

In another example, in at least one of inter-prediction, motion compensation, transform, inverse transform, quantization, dequantization, entropy encoding/decoding, deblocking filtering, adaptive sample offset, and filtering in-loop filtering of a current block, motion information after refinement on a neighboring block adjacent to a current block may be used.

For example, motion information on a current block may be determined by using motion information after refinement on a neighboring block temporally adjacent to the current block. Herein, the motion information after refinement on the neighboring block temporally adjacent to the current block may mean motion information on a col-block of the current block.

Alternatively, a boundary strength in deblocking filtering may be determined by using motion information after refinement on a neighboring block adjacent to a current block.

In another example, in at least one of generating a motion vector candidate list and generating a merge candidate list of a current block, motion information before refinement on a neighboring block adjacent to a current block may be used. Herein, a temporal motion vector or a temporal motion vector on a per subblock basis may be determined by using motion information before refinement.

In another example, in at least one of generating a motion vector candidate list and generating a merge candidate list of a current block, motion information after refinement on a neighboring block adjacent to the current block may be used. Herein, a spatial motion vector may be determined by using motion information before refinement.

In another example, at least one of a motion vector candidate list and a merge candidate list of a current block may be configured by only using motion information before refinement on a neighboring block adjacent to the current block.

In another example, when motion information on a neighboring block adjacent to a current block is motion information after refinement, the motion information after refinement on the neighboring block may be determined as non-usable when configuring at least one of a motion vector candidate list, and a merge candidate list of the current block.

Meanwhile, a motion vector before refinement and a motion vector after refinement of the current block may be stored in a memory or buffer, and used when configuring at least one of a motion vector candidate list, and a merge candidate list of a neighboring block adjacent to the current block.

In addition, a motion vector before refinement stored for the current block may be stored by being replaced with a motion vector after refinement after performing motion information refinement.

In addition, a motion vector after refinement stored after motion information refinement for the current block may be stored by being replaced with a motion vector before refinement.

In another example, when performing spatial motion information prediction on a current block, motion information before refinement on a neighboring block may be used, and when performing temporal motion information prediction, temporal motion vector prediction on a per subblock basis, and deblocking filtering, motion information after refinement may be used.

In another example, when performing spatial motion information prediction and deblocking filtering on a current block, motion information before refinement on a neighboring block may be used, and when performing temporal motion information prediction, and temporal motion vector prediction on a per subblock basis, motion information after refinement may be used.

In another example, when performing spatial motion information prediction on a current block, motion information before refinement on a neighboring block may be used, and when performing deblocking filtering, temporal motion information prediction, and temporal motion vector prediction on a per subblock basis, motion information after refinement may be used.

In another example, when a current block and a neighboring block are included in the same CTU, motion information before refinement on the neighboring block may be used when configuring at least one of a motion vector candidate list, and a merge candidate list of the current block.

In another example, when a current block and a neighboring block are not included in the same CTU, motion information after refinement on the neighboring block may be used when configuring at least one of a motion vector candidate list, and a merge candidate list of the current block.

In another example, when a current block and a neighboring block are included in the same row of CTUs, motion information before refinement on the neighboring block may be used when configuring at least one of a motion vector candidate list, and a merge candidate list of the current block.

In another example, when a current block and a neighboring block are not included in the same row of CTUs, motion information after refinement on the neighboring block may be used when configuring at least one of a motion vector candidate list, and a merge candidate list of the current block.

When performing motion information prediction on a current block, and a position of a neighboring block is included within a just previous arbitrary region in an encoding/decoding order, motion information on the neighboring block may be used by being regarded as motion information before refinement or fixed motion information predefined in the encoder/decoder. Alternatively, when a position of a neighboring block is included within a just previous arbitrary region in an encoding/decoding order, motion information on the neighboring block may be used by being regarded as motion information after refinement or fixed motion information predefined in the encoder/decoder.

Herein, the fixed motion information predefined in the encoder/decoder may be defined as a vector of (0,0), a scaled vector at a position in association with a time, or as non-usable motion information.

In the above example, motion information may include at least one of a motion vector, a reference image index, an inter-prediction indicator, and a reference image utilization flag.

In the above example, a motion vector before refinement or motion vector after refinement may be used when determining a boundary strength in deblocking filtering, and whether or not to perform filtering to a block boundary may be determined according to the determined boundary strength. When the filtering is determined to be applied, at least one of strong filtering and weak filtering may be performed.

In the above example, when a skip mode or merge mode is used for a specific block, biprediction is performed, and the product of a POC difference between a current image and reference images in an L0 angle and a POC difference between the current image and reference images in an L1 angle is smaller than 0, it may be determined that motion information refinement on the specific block is performed. When the product of a POC difference between a current image and reference images in an L0 angle and a POC difference between the current image and reference images in an L1 angle is smaller than 0, it may mean that the current image is positioned between the reference image in an L0 direction and the reference image in an L1 direction.

Hereinafter, storing motion information on a current block will be described.

The image encoding/decoding method and apparatus of the present disclosure may store motion information on a current block.

In an example, when a current block is a block on which motion information refinement is performed, motion information before refinement may be stored in a line buffer, internal memory, or external memory, and when the current block is a block on which motion information refinement is not performed, decoded motion information may be stored in the line buffer, internal memory, or external memory.

Herein, when motion information before refinement is stored for the current block, the stored motion information before refinement may be used when performing at least one process of encoding/decoding a neighboring block that is encoded/decoded after the current block.

Meanwhile, when a specific block is not adjacent to a boundary of a CTU, a picture, a subpicture, a slice, a tile, a brick, etc., motion information before refinement on the specific block may be stored, and the stored motion information before refinement may be used when performing at least one process of encoding/decoding a neighboring block that is encoded/decoded after the current block.

In another example, when information on a current block is stored, and the current block is a block on which motion information refinement is performed, at least one of a flag or mode information representing motion information before refinement or motion information before refinement, and a fixed value predefined in the encoder/decoder may be stored in the line buffer, the internal memory, and in the external memory.

Herein, the predefined value may be a vector of (0,0) or a vector at a position in association with a previous temporal picture on which encoding/decoding has completed.

In addition, storing in the line buffer and the external memory causes consumption in memory bandwidth, and thus storing in the internal memory may be performed so as to reduce memory bandwidth.

In another example, when information on a current block is stored, in the internal memory that is used for motion information prediction on blocks included in a predetermined unit, motion information before refinement or a fixed value predefined in the encoder/decoder may be stored.

Herein, motion information prediction may mean steps used when encoding/decoding a current block by using motion information on a spatially or temporally adjacent position on which encoding/decoding has completed such as motion vector prediction, merge candidate list generation, motion vector candidate list generation, etc.

Herein, the predetermined unit may be a fixed size predefined in the encoder/decoder, for example, a CTU, a maximum CU size, and a block size of a parent node in a block tree structure. Alternatively, a block size may be signaled through a SPS, a PPS, a tile group, a tile, a slice or header of a slice segment, or a parameter set.

In another example, when information on a current block is stored, and a mode of the current block is a mode performing motion information refinement, motion information before refinement may be stored so as to be used for spatial motion information prediction on a block after the current block or for deblocking on a boundary of the current block. In other words, motion information before refinement may be stored in the internal memory or line buffer, and may be used as at least one piece of candidate motion information when performing spatial motion information prediction on a block encoded/decoded after the current block. In addition, motion information before refinement may be used when performing deblocking on the current block by being stored in the internal memory or line buffer.

In another example, when information on a current block is stored, and a mode of the current block is a mode performing motion information refinement, motion information before refinement may be stored so as to be used for spatial motion information prediction on a block after the current block. In other words, motion information before refinement may be stored in the internal memory or line buffer, and may be used as at least one piece of candidate motion information when performing spatial motion information prediction on a block encoded/decoded after the current block.

In another example, when information on a current block is stored, and a mode of the current block is a mode performing motion information refinement, motion information after refinement may be stored so as to be used for performing deblocking on a boundary with the current block of a block after the current block. Motion information after refinement may be used for performing deblocking on a boundary of the current block by being stored in the internal memory or line buffer.

Hereinafter, performing motion information refinement on a current block will be described.

The image encoding/decoding method and apparatus of the present disclosure may perform motion information refinement on a current block. When performing motion information refinement on the current block, motion information after refinement that minimizes image degradation may be derived by performing motion estimation and refinement on spatially or temporally adjacent positions by using motion information derived by: loading information on a neighboring block, encoding/decoding the current block, and/or storing motion information on the current block. Subsequently, a reconstructed pixel of the current block may be generated or predicted by using the motion information after refinement.

Motion information refinement on the current block may require additional steps of performing motion estimation or deriving motion information on a per block basis in a small size. Accordingly, processing the additional steps causes time consuming. In addition, throughput may be decreased as latency for encoding/decoding on a subsequent block is also generated.

The encoding/decoding method and apparatus of the present disclosure may start, referring to FIG. 8, encoding/decoding on a current block before encoding/decoding on a neighboring block has completed. Accordingly, latency or decrease in throughput due to motion information can be solved.

A mode performing motion information refinement may be a mode in which motion information is updated by performing a predetermined process such as motion estimation by using decoded information and pixels. In other words, the mode is a mode deriving new motion information by performing refinement again on motion information calculated through entropy decoding and/or motion information prediction. For example, a mode performing motion information refinement may include DMVR, optical flow (BIO, BDOF), FRUC, bilateral matching, etc.

When motion information refinement is performed on a current block, and the current block is greater than a size of a predetermined motion information refinement performing block, motion information refinement may be performed by partitioning the current block into subblocks.

In an example, the current block may be partitioned into at least one subblock, and motion information refinement may be performed on each subblock.

In another example, when a subblock is defined as a shape of W×H (herein, W and H are a positive integers other than 0, respectively, W means a width, and H means a height), and motion information refinement may be performed by partitioning a current block into at least one subblock when the current block is greater than the shape of W×H. Herein, W and H may be 16.

In another example, a subblock may be defined as a fixed number of pixels rather than a shape, and motion information refinement may be performed by partitioning a current block into subblocks having the fixed number of pixels.

In another example, motion information refinement may be performed by partitioning a current block into subblocks according to a combination of a shape and a number of pixels.

Herein, each subblock may share motion information on a current block (CU). In addition, each subblock may use motion information on the current block as a start motion vector for motion information refinement. Alternatively, motion information on a current block may be used as initial motion information on each subblock. In addition, prediction list utilization flag information on the current block may be used as prediction list utilization flag information on each subblock. Herein, before performing motion information refinement on each subblock, initial motion information may be set as motion information before performing motion information refinement on the current block.

Accordingly, motion compensation can be independently performed on each subblock without dependency on each other, and the image encoding/decoding method and apparatus of the present disclosure can perform parallel processing.

In another example, when a width and/or a height of a current block is greater than 16, the current block may be partitioned into subblocks with a width and/or a height of 16. Herein, motion information refinement may be performed on a per subblock basis.

Herein, a maximum size of the predefined motion information refinement performing block may be 16×16.

Herein, a number of subblocks in a horizontal direction may be an integer value obtained by partitioning the width of the current block by 16. In addition, a number of subblocks in a vertical direction may be an integer value obtained by partitioning the height of the current block by 16.

When performing motion information refinement on a current block, and the current block is greater than the size of the predetermined motion information refinement performing block, motion information refinement may be performed by partitioning the current block into subblocks. Herein, at least one incomplete subblock may be included.

Herein, a shape of the incomplete subblock may be SW×SH (herein, SW<W or SH<H) when the width or the height of the current block is not the multiple of a width (W) or a height (H) of the predefined motion information refinement performing block, respectively.

In an example, motion information refinement may be omitted on the incomplete subblocks. In other words, motion compensation on the incomplete subblock may be performed by using motion information on the current block.

In another example, motion information refinement may not be performed on incomplete subblocks, and motion compensation may be performed on the same by sharing motion information after refinement of a spatially adjacent complete subblock having a W×H shape. Herein, for the incomplete subblock positioned at the right corner within the current block, motion information of the complete subblock positioned at the just left side may be used. Alternatively, for the incomplete subblock positioned at the lowest corner within the current block, motion information on the complete subblock positioned at the just upper side may be used.

Alternatively, for the incomplete subblock positioned at the lower right corner within the current block, motion information on the complete subblock positioned at the just upper left side may be used. In other words, motion information before refinement of the incomplete subblocks may be derived from motion information before refinement on spatially adjacent complete subblocks. In addition, motion information after refinement on the incomplete subblocks may be derived from motion information after refinement on spatially adjacent complete subblocks.

Meanwhile, spatially adjacent complete subblocks used when deriving motion information on incomplete subblocks may be different from each other when deriving motion information before refinement and motion information after refinement.

When performing motion information refinement on a current block, padding or a low-complexity interpolation filter may be used for a reference region. Memory bandwidth or employment complexity can be reduced by using the padding or low-complexity interpolation filter.

When a maximum range of motion information refinement is S (S is a positive integer other than 0) in at least one direction (upper, low, left or right) on a per integer pixel basis, a range of a maximum reference region for motion compensation or motion estimation may expand by S than that of before motion information refinement. Accordingly, memory bandwidth increases or a size of a cache memory increases. Accordingly, the image encoding/decoding method and apparatus of the present disclosure solves the above problem by using padding or low-complexity interpolation filter.

In an example, padding may be performed on values of outmost pixels within a reference range required for interpolation filter.

Figure 10:
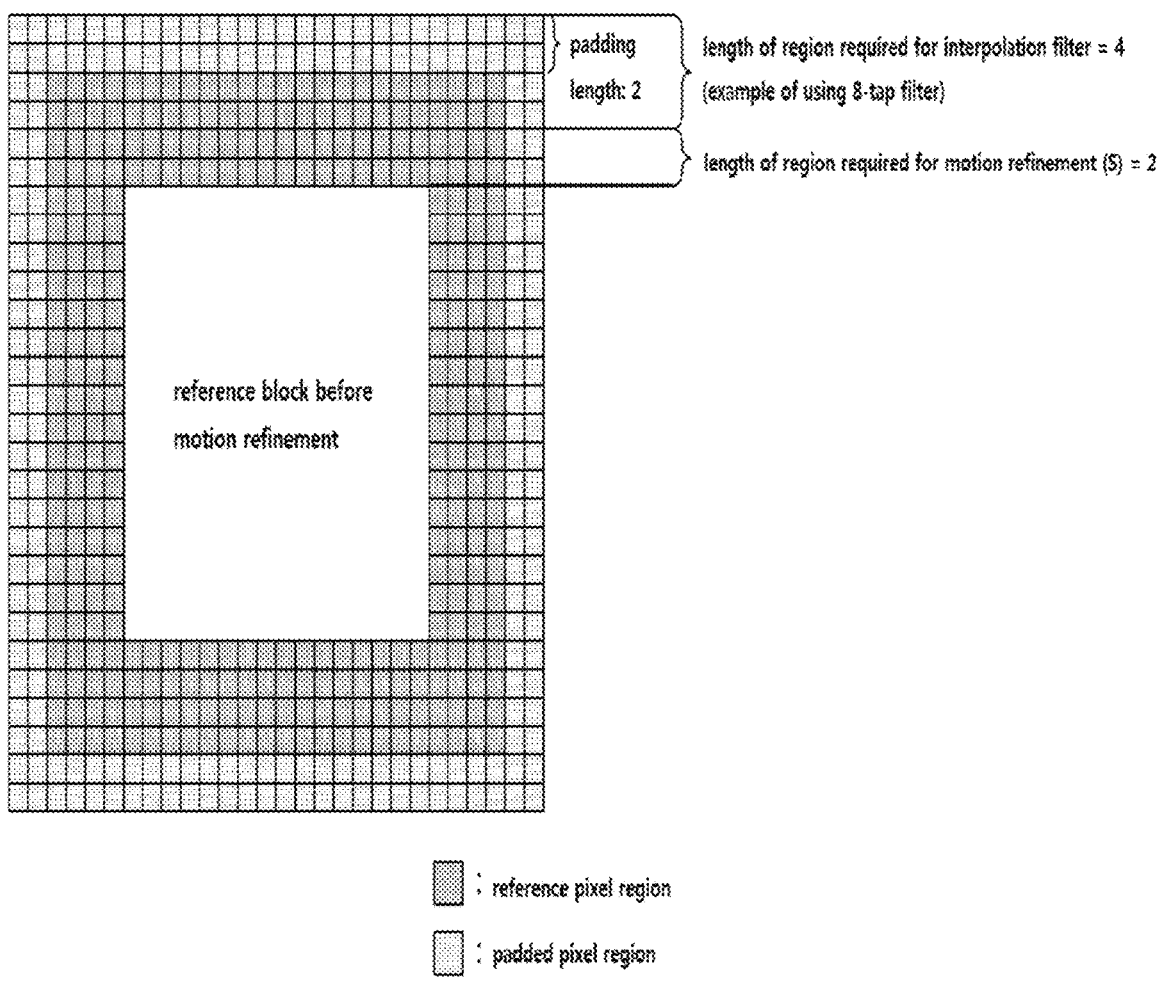
FIG. 10 is a view showing padding a reference region according to an embodiment of the present invention.

FIG. 10 is a view showing padding a reference region according to an embodiment of the present invention.

Referring to FIG. 10, the encoder/decoder may perform motion estimation or motion compensation by performing padding on values of outmost pixels within a reference range required for an interpolation filter such that an external region of the reference range required for the interpolation filter is not used when performing motion information refinement. As a result, the memory bandwidth and the size of the cache memory may be identical to a case where motion information refinement is not performed.

In another example, a length of an interpolation filter may be adjusted when performing motion information refinement. In other words, in order to perform motion estimation or motion compensation, the encoder/decoder may use an interpolation filter having a relatively short length so as to reduce a range of the reference region required for motion interpolation. For example, the interpolation filter may mean a bi-linear interpolation filter.

Figure 11:
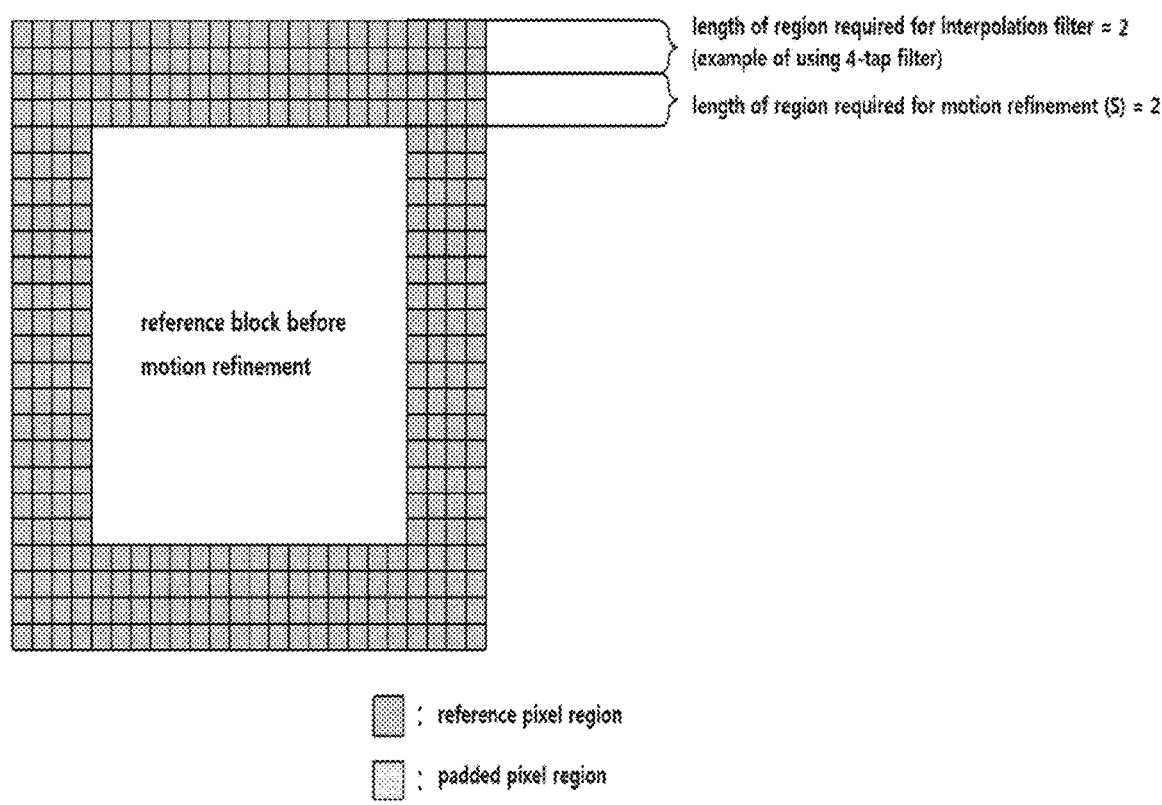
FIG. 11 is a view showing adjusting a length of an interpolation filter according to an embodiment of the present invention.

FIG. 11 is a view showing adjusting a length of an interpolation filter according to an embodiment of the present invention.

Referring to FIG. 11, even when an 8-tap interpolation filter is used for general motion compensation, a low complexity 4-tap or 2-tap interpolation filter may be used for motion compensation or motion estimation in a mode performing motion information refinement. Herein, the 4-tap interpolation filter may mean an interpolation filter having a search region of +2, −2.

Accordingly, the range of the reference region required for interpolation may be reduced by four rows or five pixel lines in a vertical direction or by four rows or five pixel lines in a horizontal direction. As a result, the memory bandwidth and the size of the cache memory can be identical to a case where motion information refinement is not performed. Herein, the low-complexity interpolation filter may be used only for motion estimation in a mode performing motion information refinement, and when performing motion compensation, an interpolation filter identical to that of another mode may be used.

When performing motion information refinement on a current block, and it is determined that a motion vector after refinement or a candidate motion vector during refinement exceeds a range of a minimum motion vector or a maximum motion vector which is predefined in the encoder and/or decoder, the encoder and/or decoder may perform operations described below.

In an example, the encoder/decoder may not perform motion information refinement implicitly.

In another example, the encoder/decoder may use candidate search points or motion vectors within a search region in which a motion vector that does not exceed the minimum motion vector or maximum motion vector is derived as a candidate of motion information after refinement.

In another example, the encoder/decoder may use clipping so that a motion vector after refinement is included in the predetermined range.

In another example, the encoder/decoder may use scaling so that a motion vector after refinement is included in the predetermined range.

In another example, the encoder/decoder may perform motion information refinement by setting a maximum cost value for the search point which exceeds the maximum motion vector.

In other words, the encoder/decoder may derive a new motion vector by using the same search method and the same motion vector deriving method for candidate motion vectors, and a motion vector with a minimum search cost may be determined as a motion vector after refinement.

For example, for L0 and L1, a new motion vector may be derived by using the same search method and the same motion deriving method while using different directions of candidate motion vectors.

Herein, when the candidate motion vector exceeds the maximum motion vector or the minimum motion vector, a predefined maximum value (for example, $2^{32-1}$, $2^{64-1}$, etc.) may be set for a search cost of the candidate motion vector. Meanwhile, for the search cost, a cost evaluation method such as SAD (sum of absolute difference), SSD (sum of squared difference), etc. may be used.

For example, by using SAD, a candidate motion vector may be derived where a difference between pixels values at a position indicated by a candidate motion vector within a region within a L0 reference picture, and at a position indicated by a vector opposite to the candidate motion vector within a region within a L1 reference picture. Herein, the candidate motion vector may be a motion vector after refinement.

Meanwhile, a case where the candidate motion vector exceeds the minimum motion vector includes a case where at least one of x and y values of the candidate motion vector is smaller than x and y values of the corresponding minimum motion vector.

In addition, a case where the candidate motion vector exceeds the maximum motion vector includes a case where at least one of x and y values of the candidate motion vector exceeds x and y values of the corresponding maximum motion vector.

Herein, the maximum motion vector or minimum motion vector may be signaled through a header or parameter set (log 2_max_mv_length_horizontal, log 2_max_mv_length_vertical of SPS VUI), or may be derived by using a value predefined in the same range in the encoder/decoder.

Figure 12A:
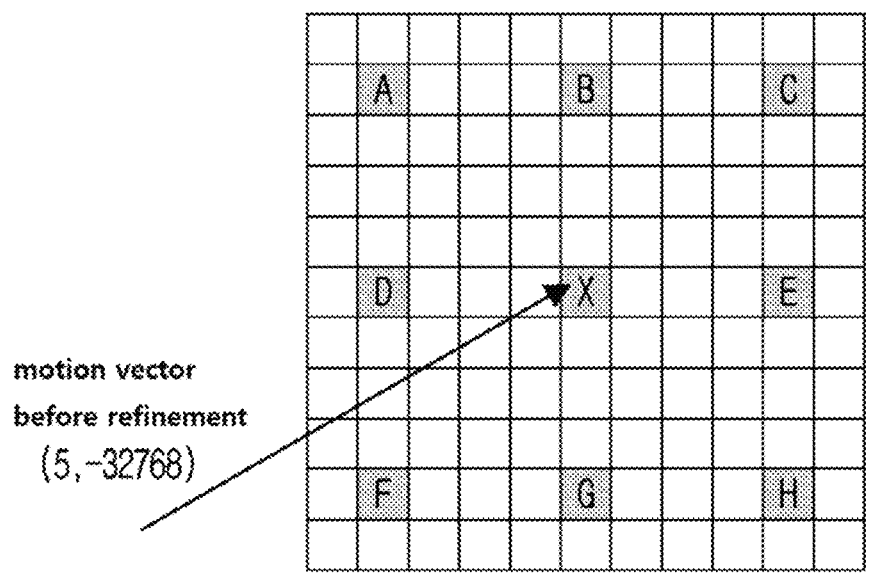
FIG. 12a is a view showing operations when a motion vector candidate exceeds a minimum motion vector range when performing motion information refinement according to an embodiment of the present invention.

FIG. 12*a* is a view showing operations when a motion vector candidate exceeds a minimum motion vector range when performing motion information refinement according to an embodiment of the present invention.

Referring to FIG. 12*a*, when an x or y value of a minimum motion vector is −32768, and a motion vector before refinement is (5, −32768), which are defined in the encoder/decoder, motion information refinement may be performed by using refinement candidates A to H of motion information. Herein, in case of positions A, B, and C, a y value of a motion vector after motion information refinement becomes −32769, and thus becomes smaller than the y value of the minimum motion vector. Accordingly, as described above, positions A, B, and C, may not be used as motion compensation candidates, or a search cost at A, B, and C may be set to a predefined maximum value.

When performing motion information refinement on a current block, and it is determined that a motion vector after refinement or motion vector candidate during refinement (or refinement candidate of motion information) exceeds MCTS (motion constrained tile set) or tile boundary, or is present within the boundary but a reference region thereof taking into account an interpolation filter exceeds the MCTS or the tile boundary, the encoder and/or decoder may perform operations below.

In an example, the encoder/decoder may not perform motion information refinement implicitly.

In another example, the encoder/decoder may not use the corresponding candidate search points or corresponding candidate motion vectors as candidate motion vectors.

In another example, the encoder/decoder may perform motion information refinement by setting a cost for the corresponding candidate search points or corresponding candidate motion vectors to a maximum value.

In another example, the encoder/decoder may determine the MCTS or tile boundary as a picture boundary, and perform motion information refinement by padding pixels positioned at the boundary. Herein, the encoder/decoder may determine the MCTS or tile boundary as a picture boundary, and perform motion information refinement by padding pixels positioned at the boundary.

Figure 12B:
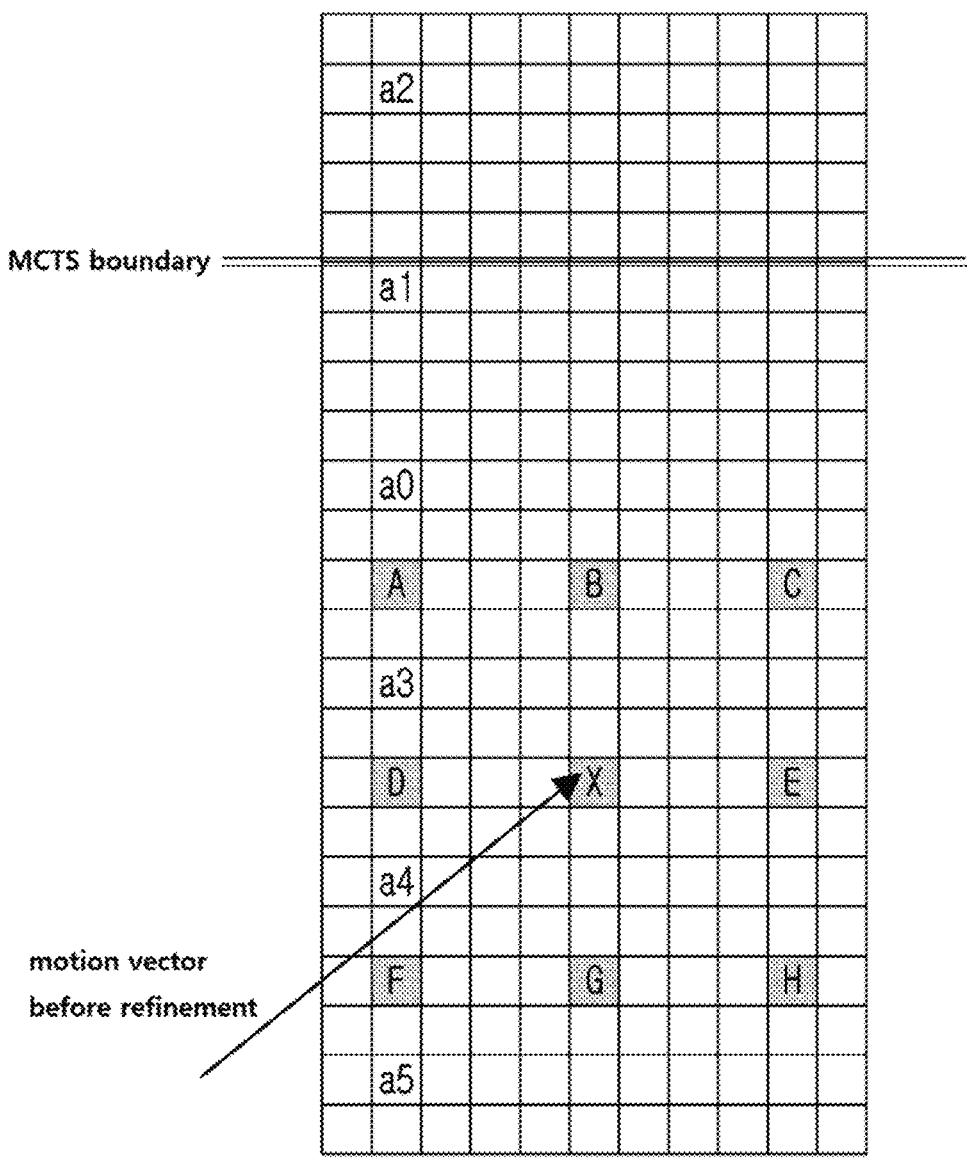
FIG. 12b is a view showing operation when a motion vector candidate exceeds a restriction in MCTS when performing motion information refinement according to an embodiment of the present invention.

FIG. 12*b* is a view showing operation when a motion vector candidate exceeds a restriction in MCTS when performing motion information refinement according to an embodiment of the present invention.

The encoder/decoder may use a 6-tap interpolation filter. Restriction in MCTS may mean restriction is applied so as to use a region temporally corresponding to a current MCTS when performing encoding/decoding.

Referring to FIG. 12*b*, in case of a motion vector X of motion information before refinement, the same is a sub-pixel (1 pixel) position, and interpolation filtering is required. Herein, positions of integer pixels used for interpolation filtering are present within the current MCTS, and thus the MCTS restriction is not violated. However, in case of a motion vector candidate A, the same is a subpixel position, and interpolation filtering required. Herein, among integer pixels a0 to a5 used for interpolation filtering, a2 is a pixel present in another MCTS, and thus the MCTS restriction is violated. Motion vector candidates B and C violate the MCTS restriction as the motion vector candidate A. Accordingly, as described above, positions A, B, and C may not be used as motion vector candidates, motion refinement candidates, or motion compensation candidates. Alternatively, a search cost for A, B, and C may be set to a predefined maximum value.

Hereinafter, storing motion information after refinement on a current block will be described.

The image encoding/decoding method and apparatus of the present disclosure may store motion information on a current block.

In case of a mode performing motion information refinement on a current block, motion information before refinement on the current block and/or motion information after refinement on the current block may be stored.

In an example, at least one of a flag representing motion information before refinement, motion information after refinement, and/or motion information after refinement, and may be stored. For example, the same may be stored in the line buffer, the internal memory, and/or in the external memory.

In another example, a flag or mode information representing motion information before refinement and motion information after refinement motion may be stored.

Meanwhile, storing in the line buffer and/or in the external memory causes consumption in memory bandwidth, and thus only the motion information after refinement is stored in the line buffer and/or in the external memory so as to reduce bandwidth consumption.

In another example, information on motion information before refinement on a current block and/or neighboring block, and information on a difference between motion information before refinement and motion information after refinement may be stored.

In another example, information on motion information after refinement on a current block and/or neighboring block, and information on a difference between motion information before refinement and motion information after refinement may be stored.

In another example, when motion information after refinement on a current block is stored, performing encoding/decoding on a neighboring block encoded/decoded after the current block, the stored motion information after refinement may used.

In case of a mode performing motion information refinement on a current block, motion information before refinement and motion information after refinement may be stored in different memories or parameters according to the purpose of use.

In an example, motion information before refinement on a current block may be used for spatial motion information prediction on a block after the current block and/or for deblocking on the current block.

In another example, motion information after refinement on a current block may be used for deriving at least one motion information candidate when performing motion compensation on the current block and/or temporal motion information prediction on an arbitrary block of a picture that is encoded/decoded after the current picture.

In an example, motion information before refinement on a current block may be used for spatial motion information prediction on a block after the current block.

In another example, motion information after refinement on a current block may be used for deriving at least one motion information candidate when performing deblocking on the current block, motion compensation on the current block, and/or temporal motion information prediction on an arbitrary block of a picture encoded/decoded after a current picture.

In another example, motion information before refinement may be used by being stored in the internal memory. However, motion information after refinement may be used by being stored in the external memory and/or line buffer.

In another example, when motion information after refinement on a current block is stored, and all blocks included in a predetermined unit are encoded/decoded, the motion information after refinement may be stored in the line buffer or internal memory, and in the external memory.

Herein, when motion information before refinement used when performing motion information prediction on blocks included in the predetermined unit is stored in the internal memory, the same may be updated to motion information after refinement. In addition, motion information before refinement may not be updated to motion information after refinement according to a predetermined condition. For example, when motion information after refinement is equal to or greater than a predefined threshold range, updating may not be performed.

In case of a mode performing motion information refinement on a current block, when the current block is greater than a size of a predefined motion information refinement performing block, motion information refinement may be performed by partitioning the current block into subblocks.

In an example, at least one piece of motion information after refinement may be derived for one current block. The at least one piece of motion information after refinement may be stored in a temporal motion vector memory. In addition, the stored motion information after refinement may be used when deriving at least one motion information candidate when performing temporal motion information prediction on an arbitrary block of a picture encoded/decoded after the current picture.

In an example, at least one piece of motion information after refinement on subblocks may be derived for one current block. The at least one piece of motion information after refinement on the subblocks may be stored in a temporal motion vector memory. In addition, the stored motion information after refinement may be used when deriving at least one motion information candidate when performing temporal motion information prediction on an arbitrary block of a picture encoded/decoded after the current picture.

In case of a mode performing motion information refinement on a current block, motion information being used may vary according to a position of a neighboring block.

In an example, motion information before refinement may be stored in the internal memory. In addition, motion information after refinement may be stored in the external memory and/or line buffer.

In another example, in an example of FIG. 9b, when performing motion estimation on a current block C, for motion information on an upper neighboring block, motion information after refinement may be used, and for motion information on a left neighboring block, motion information before refinement may be used.

In another example, in the example of FIG. 9b, when performing motion estimation on a current block C, for motion information on the upper neighboring block, motion information before refinement may be used, and for motion information on the left neighboring block, motion information after refinement may be used.

In another example, when performing motion estimation on a current block, and motion information before/after refinement is used for motion information on some neighboring blocks, for motion information on remaining neighboring blocks, motion information after/before refinement may be respectively used. In an example, in the example of FIG. 9b, when performing motion estimation on the current block C, and motion information after refinement is used for motion information on the upper neighboring block, unlike the upper block, motion information before refinement may be used for motion information on the left neighboring block.

Meanwhile, when a specific block is adjacent to a boundary of a CTU, a picture, a subpicture, a slice, a tile, a brick, etc., motion information after refinement on the specific block may be stored. In addition, the stored motion information after refinement may be used when encoding/decoding a neighboring block encoded/decoded after the current block.

For various CU sizes, the encoder of the present disclosure may determine a CU size that is optimum in terms of rate-distortion. In addition, the encoder of the present disclosure may determine a mode for each CU which is optimum in terms of rate-distortion among various prediction modes (intra-prediction, inter-prediction, merge/skip, etc.).

Generally, the hardware of the encoder may be employed by independent hardware blocks respectively being in charge of CU sizes. In order to increase throughput, the mode determining process and the encoding process may be employed in a pipeline form. Herein, in inter-prediction, motion estimation and motion compensation may be performed even though a mode determining process and an encoding process on a neighboring block are not completed. However, in a merge mode, motion information on a neighboring block may be used as it is, and thus encoding in a merge mode and motion compensation on the current block may be performed when the mode determining process on the neighboring block has completed. Accordingly, latency may occur for the current block by waiting until the mode determining process on the neighboring block has completed, and thus throughput decreases.

According to the present invention, in case of a neighboring block on which a mode determining process is in progress, motion information on the neighboring block may not be used, or fixed motion information predefined in the encoder/decoder may be used so as to solve problem of latency occurrence and decrease in throughput.

The image encoding/decoding method of the present disclosure may be used for a merge mode, as well as, for an inter-prediction, an affine mode, OBMC which use motion information on a neighboring block. In addition, the image encoding/decoding method may be used in a method of using motion information on a per subblock basis.

Figure 13A:
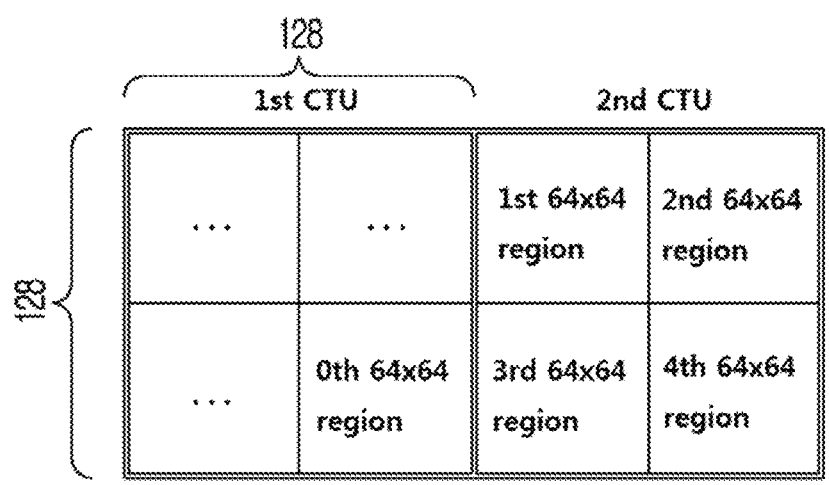
FIGS. 13a to 13c are views respectively showing encoding a current block according to an embodiment of the present invention.
Figure 13B:
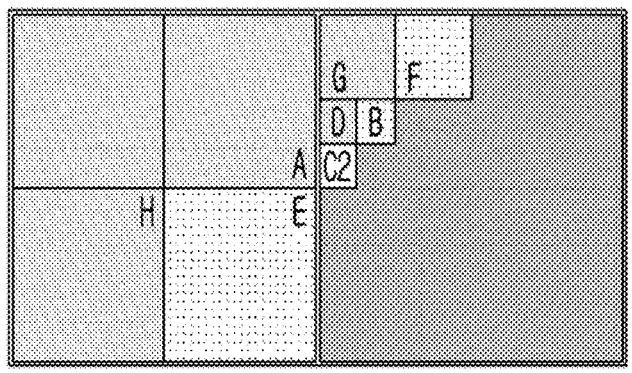
Figure 13C:
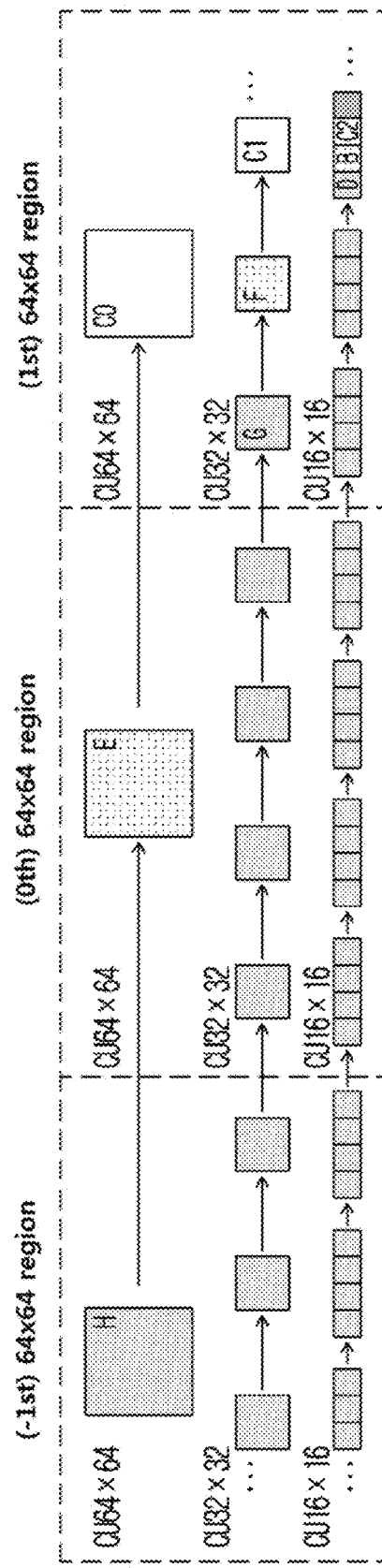

FIGS. 13a to 13c are views respectively showing encoding a current block according to an embodiment of the present invention.

In examples shown in FIGS. 13a to 13c, it is assumed that a size of a CTU is 128×128, three candidates (CU 64×64, CU 32×32, CU 16×16) may be present for a CU size, and encoding is performed on a current block C2.

Referring to FIGS. 13a and 13b, the current block C2 to be encoded is positioned within the first 64×64 region within the second CTU.

Referring to FIG. 13c, a processing order of candidates of CU sizes and an encoding progress state are shown. A mode determining process on the current block may start when encoding of a previous block in an encoding/decoding order has completed. Herein, encoding being completed may mean that a mode determining process has completed for various modes, information on a final motion vector and on a reconstructed pixel is derived, and the corresponding information is stored in the internal memory. Meanwhile, in order to increase throughput, for the encoder of the present disclosure, a mode determining process and an encoding process may be employed in a pipeline form. In addition, in order to increase throughput, a mode determining process on a subsequent block in an encoding/decoding order has to be performed before encoding/decoding on an arbitrary block has completed. Herein, for an intra-prediction mode using pixels of a neighboring block, encoding of the neighboring block has to be completed. However, for an inter-prediction mode, a merge/skip mode, an affine mode, an OBMC mode, etc., encoding may be performed by using motion information on a neighboring block on which encoding has completed.

In an example, when encoding of the current block C2 starts, motion information prediction may be performed by using motion information on a neighboring block A and/or D on which encoding has completed, and thus encoding for an inter-prediction mode, a merge/skip mode, an affine mode, an OBMC mode, etc. may be progressed. Accordingly, herein, whether or not encoding on a neighboring block used in a mode for motion information prediction has completed may be determined.

Referring to FIG. 13c, a processing order of candidates of CU sizes and an encoding progress state are shown.

Referring to FIG. 13c, a CU 64×64 hardware block being C0, a CU 32×32 hardware block being C1, and a CU 16×16 hardware block being C2 are current encoding target blocks, and motion information prediction on the above blocks may be performed.

Herein, when performing motion information prediction on a block C0, using motion information on a block E that is a previous block in an encoding/decoding order may be impossible. In addition, when performing motion information prediction on a block C1, using motion information on a block F may be impossible. In addition, when performing motion information prediction on a block C2, using motion information on a block B may be impossible.

In addition, each hardware block (CU 64×64, CU 32×32, CU 16×16) may perform encoding at the same time, and thus for the block C2, using motion information on a region in which a block E and a block FDP are additionally included may be impossible. In addition, for the block C1, using motion information on a region in which a block E is additionally included may be impossible. In sum, when performing motion information prediction on the block C2, using motion information on neighboring blocks B, E, and F may be impossible.

Accordingly, in terms of the encoder, performing motion information prediction may be efficient in terms of compression efficiency by excluding regions on which encoding is in progress among reference regions of the current block, and by using motion information on neighboring blocks included in the remaining regions on which encoding has completed. However, as an example of generating a merge candidate list, when a step of determining whether or not motion information on a neighboring block at a predefined position is valid (that is, whether no not being intra-prediction) or determining whether or not being identical to motion information added to a list is included, the encoder/decoder may be provided with a prediction mode and/or motion information on a neighboring block so as to generate the same merge candidate list.

The encoder/decoder of the present disclosure can improve throughput and minimize loss in compression efficiency by encoding/decoding a current block before encoding on a neighboring block has completed. In an example, in terms of the encoder, a method of determining a neighboring block on which encoding is in progress and/or a process of excluding the generating of a merge candidate list for the corresponding neighboring block may be identically applied to the decoder of the present disclosure. In another example, the encoder/decoder of the present disclosure may use motion information on another neighboring block or motion information generated by using a method predefined in the encoder/decoder in place of the excluded candidate motion information.

Figure 14:
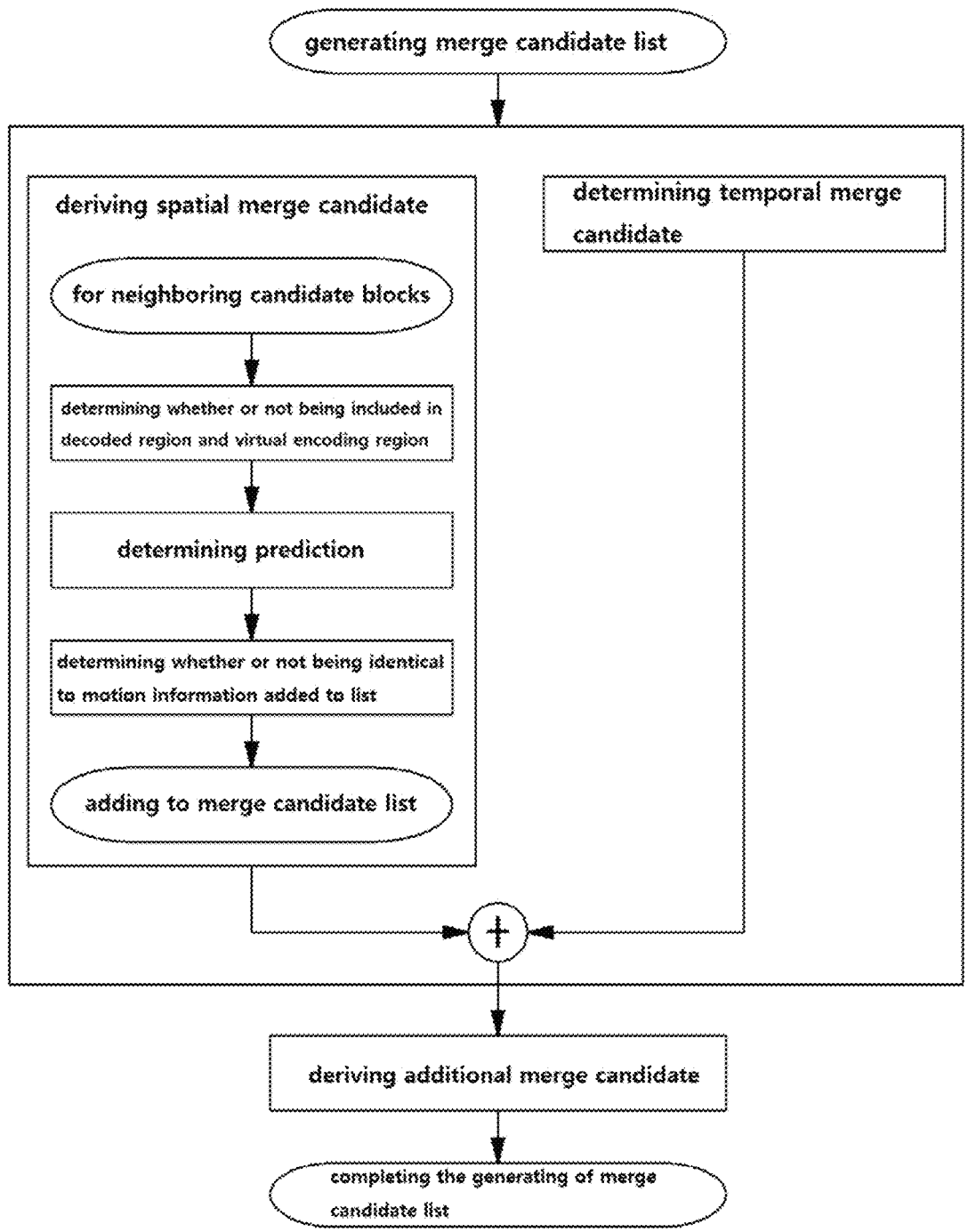
FIG. 14 is a view of a flowchart of generating a merge candidate list according to an embodiment of the present invention.

FIG. 14 is a view of a flowchart of generating a merge candidate list according to an embodiment of the present invention.

In deriving a spatial merge candidate, the encoder/decoder may determine whether or not positions of predefined neighboring blocks are included in an encoded/decoded region. In addition, a virtual encoding region may be determined, and the corresponding region and/or block may be excluded from generating a merge candidate list. Herein, the virtual encoding region may mean a neighboring block and a region on which encoding is in progress.

Figure 15A:
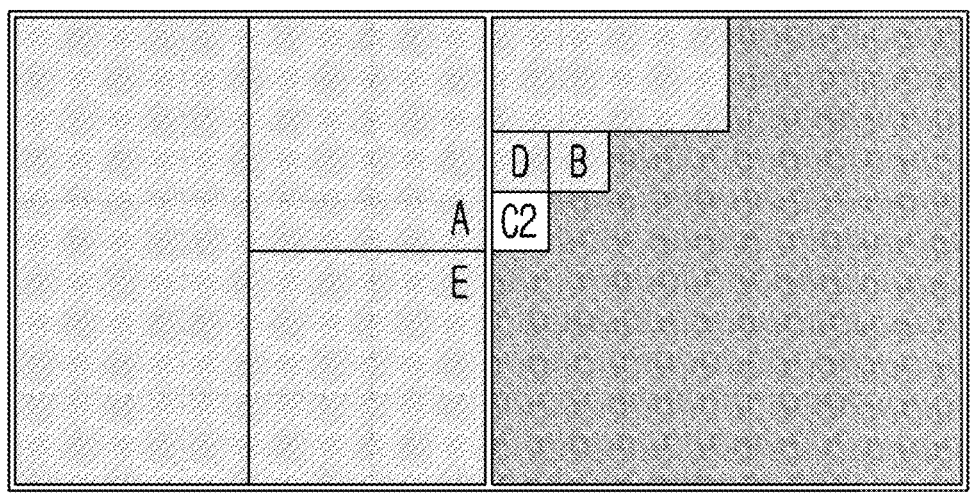
FIGS. 15a to 15c are views respectively showing merge candidate lists generated according to an embodiment of the present invention.
Figure 15B:
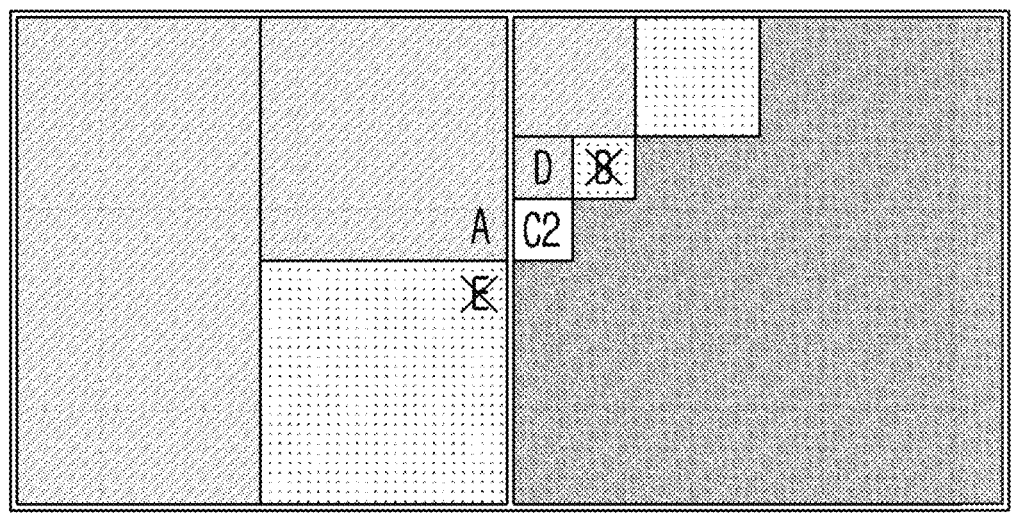
Figure 15C:
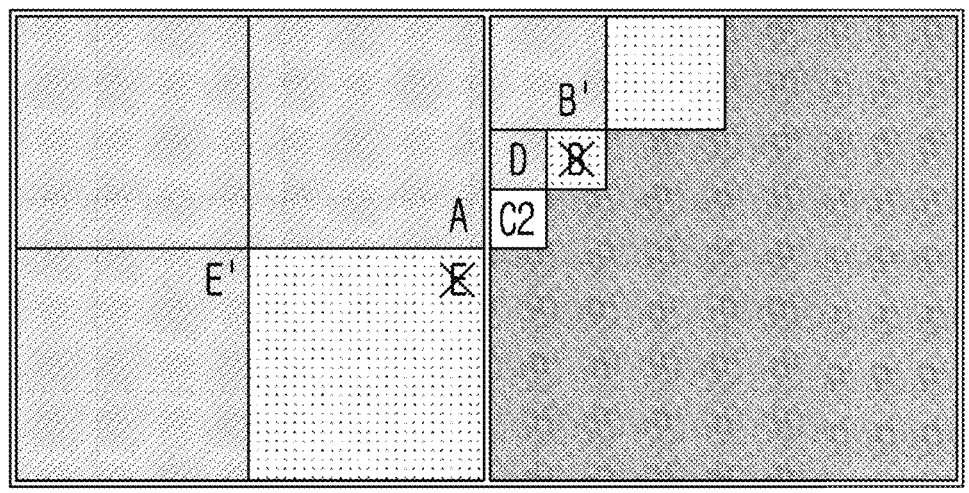

FIGS. 15a to 15c are views respectively showing merge candidate lists generated according to an embodiment of the present invention.

In example shown in FIGS. 15a to 15c, a merge candidate list of a current block C2 may include up to five merge candidates. In addition, when generating a merge candidate list, neighboring blocks A, B, D, and E may be used, and may be added to the merge candidate list in an order of A, B, D, and E.

FIG. 15a shows an example of generating a merge candidate list without determining whether or not a neighboring block is included in a virtual encoding region, and assuming that encoding/decoding on the neighboring block has completed.

FIG. 15b shows an example of generating a merge candidate list by determining whether or not a neighboring block is included in a virtual encoding region, and excluding a block included in the virtual encoding region according to the determination. Herein, encoding on neighboring blocks B and E may be in progress as shown in FIGS. 13a to 13c, the blocks are excluded from a merge candidate list, and additional motion information may be added in merge candidate indices of 3 and 4.

FIG. 15c shows another example of generating a merge candidate list by determining whether or not a neighboring block is included in a virtual encoding region, and excluding a block included in the virtual encoding region according to the determination. Comparing with FIG. 15b, in place of neighboring blocks B and E which are excluded from a merge candidate list, motion information on B' and E' on which encoding/decoding are completed at positions adjacent to the respective B and E may be added to the merge candidate list.

Meanwhile, an order of adding additional motion information and/or motion information at positions on which encoding/decoding has completed to the merge candidate list may differ from the example shown in FIG. 15b or 15c.

When performing motion information prediction, and a position of neighboring block to be used is included in a just previous region in an encoding/decoding order (that is, virtual encoding region), motion information on the corresponding neighboring block may not be used for motion information prediction on a current block, or predefined fixed motion information may be used for the same. Herein, the virtual encoding region may be a block having a size equal to or greater than a size of the current block among block sizes that are estimated being used in the encoder. Alternatively, the virtual encoding region may mean a size of a pipeline buffer predefined in the encoder/decoder.

When performing motion information prediction, and a position of a neighboring block to be used is included in a virtual encoding region in which a current block is positioned (that is, when the position is present within a grid of the same virtual encoding region), motion information on the corresponding neighboring block may not be used for motion information prediction on a current block, or predefined fixed motion information may be used for the same.

The decoder may derive virtual encoding regions by assuming that the encoder has used a minimum block size and a maximum block size (or maximum transform size), which are predefined in the encoder/decoder, and all block sizes included in the minimum block size and the maximum block size even though accurate sizes of all candidate blocks actually used in the encoder are not provided. Alternatively, the encoder may signal a minimum block size, a maximum block size, or sizes of all blocks through a header (SPS, PPS, slice header, tile header, etc.) or parameter set, and the decoder may derive a minimum block size, a maximum block size, or sizes of all blocks used in the encoder by using the signaled information.

Figure 16:
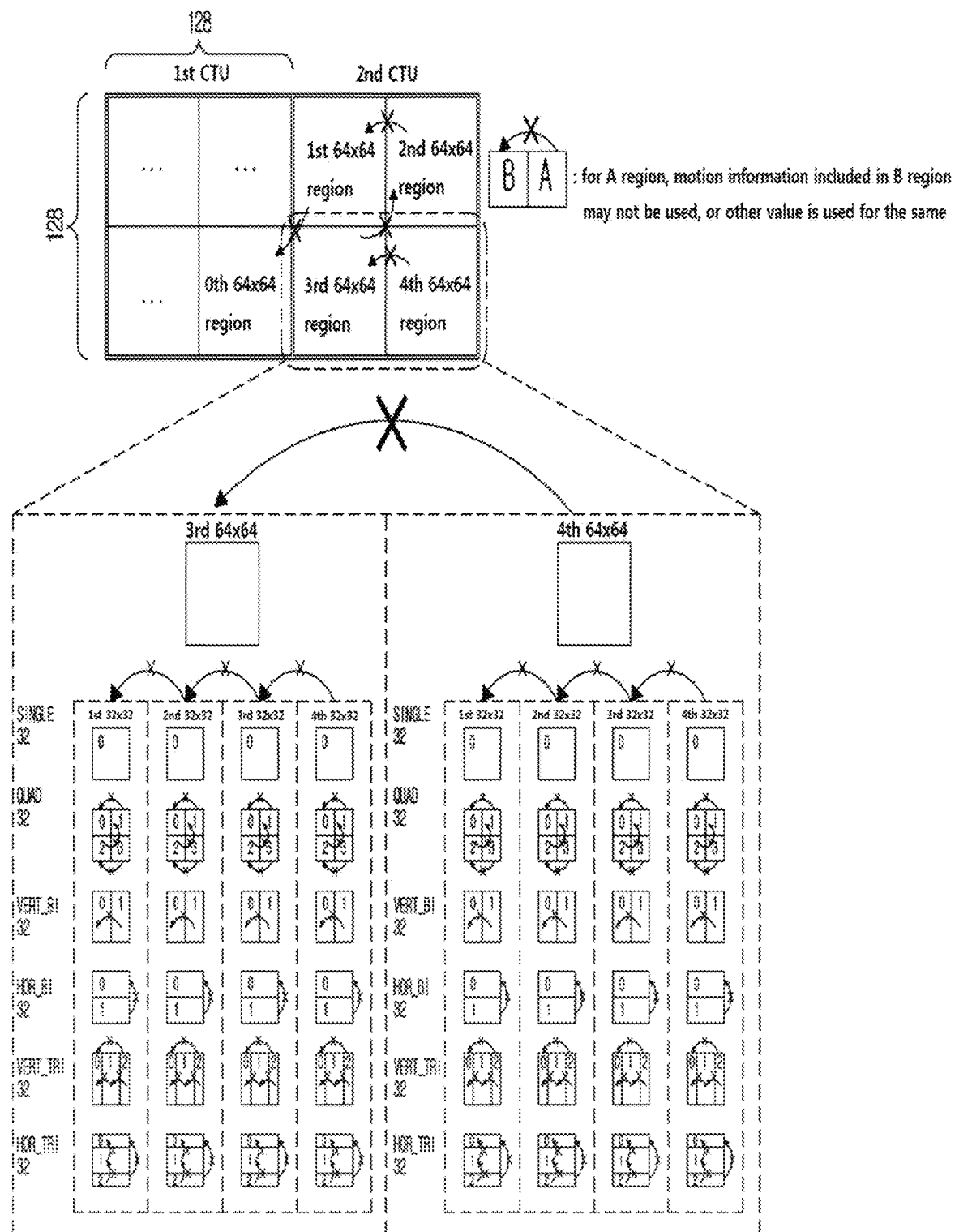
FIG. 16 is a view showing a position of a neighboring block that is not used when predicting motion information on various blocks in the encoder according to an embodiment of the present invention.

FIG. 16 is a view showing a position of a neighboring block that is not used when predicting motion information on various blocks in the encoder according to an embodiment of the present invention.

In an example of FIG. 16, a size of a CTU is 128×128, and an encoding candidate block may include a 64×64 block, a 32×32 block, a QUAD 32 block obtained by partitioning the 32×32 region into four 16×16, a VERT_BI 32 block obtained by partitioning the 32×32 region into two 16×32 blocks, a HOR_BI 32 block obtained by partitioning the 32×32 region into two 32×16 blocks, a TRI_VERT 32 block obtained by partitioning the 32×32 region into two 8×32 blocks and one 16×32 block, and a TRI_HOR 32 block obtained by partitioning the 32×32 region into two 32×8 blocks and one 32×16 block.

When performing motion information prediction, throughput can be improved by excluding motion information on neighboring blocks included in a virtual encoding region, or by using another information in place of the same.

In an example of FIG. 16, when performing motion information prediction on a block or region, the block or region which is not used may be represented by using arrows.

In an example, when performing motion information prediction on the third 64×64 block, motion information included in a just previous 64×64 region in an encoding/decoding order (that is, the second 64×64 region) may not be used.

In another example, when performing motion information prediction on a SINGLE 32 that is a candidate block of the fourth 32×32 region within the third 64×64 region, motion information included in a just previous 32×32 region in an encoding/decoding order (that is, the third 32×32 region within the third 64×64 region) may not be used. In addition, motion information included in a just previous 64×64 region in an encoding/decoding order (that is, the second 64×64 region) may not be used.

In another example, when performing motion information prediction on a block 1 (16×32) of a VERT_BI 32 that is a candidate block of the second 32×32 region within the fourth 64×64 region, motion information included in a just previous 16×32 region in an encoding/decoding order (that is, just previous block 0) may not be used. In addition, motion information included in a just previous 32×32 region in an encoding/decoding order (that is, the first 32×32 region within the fourth 64×64 region) may not be used. In addition, motion information included in a just previous 64×64 region in an encoding/decoding order (that is, the third 64×64 region) may not be used.

When an arbitrary region is partitioned into multiple blocks, by assuming that encoding on all blocks within the arbitrary region is performed at the same time, motion information present within the arbitrary region may not be used, or fixed motion information predefined in the encoder/decoder may be used.

In an example, in case of TRI_VERT 32 partition, for a block 2 within a 32×32 region, motion information on a block 1, nor on a block 0 may be used.

In another example, in case of TRI_HOR 32 partition, for a block 2 within a 32×32 region, motion information on a block 1, nor on a block 0 may be used.

The encoder of the present disclosure may not designate a virtual encoding region for at least one block size, or may designate a virtual encoding region for at least one block size. Herein, the encoder may signal information on a block size for which a virtual encoding region is designated or not through a header (SPS, PPS, slice header, tile header, etc.) or parameter set, and the decoder may derive the designated virtual encoding region by using the signaled information.

Figure 17A:
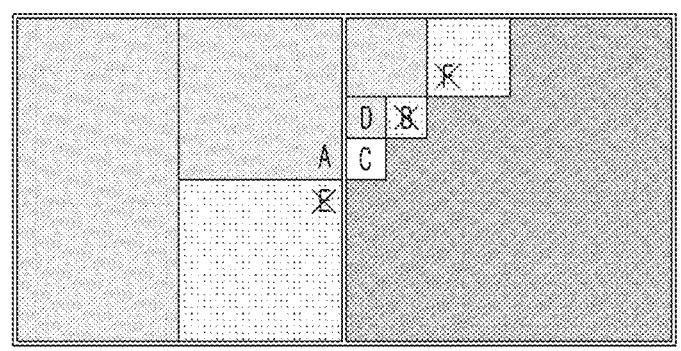
FIGS. 17a and 17b are views respectively showing designating a virtual encoding region according to an embodiment of the present invention.
Figure 17B:
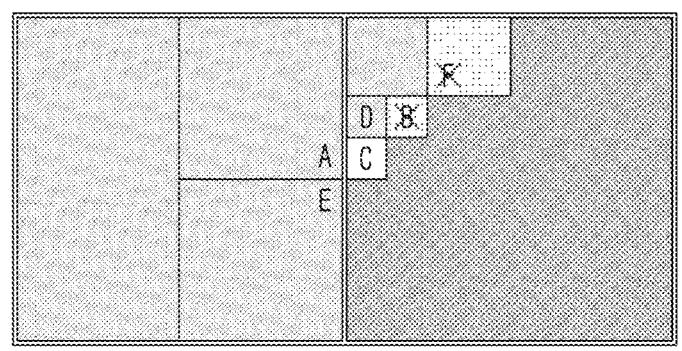

FIGS. 17a and 17b are views respectively showing designating a virtual encoding region according to an embodiment of the present invention.

In an example, in an example shown in FIG. 17a, for a current block C of a 16×16 size, motion information on neighboring blocks B, F, and E included in previous regions in an encoding/decoding order (16×16, 32×32, 64×64) may not be used.

Herein, when a 64×64 block size is not designated as a virtual encoding region, as an example shown in FIG. 17b, motion information included in a neighboring block E may be used.

In another example, in FIG. 17a, when block sizes of 16×16 and 64×64 are not designated as a virtual encoding region, for the current block C of a 16×16 size, motion information included in neighboring blocks B, and E may be used.

When performing image encoding/decoding, in intra-prediction, pixels of a current block may be predicted by using pixels of a neighboring block on which encoding/decoding has completed. Accordingly, encoding/decoding multiple blocks at the same time is impossible, and improving throughput is difficult in case of a pipeline form employment.

When encoding/decoding in an intra-prediction mode, the image encoding/decoding method and apparatus of the present disclosure enables encoding/decoding on multiple blocks within an arbitrary unit at the same time by generating a virtual reference pixel in place of a neighboring block pixel on which encoding/decoding has completed.

Figure 18:
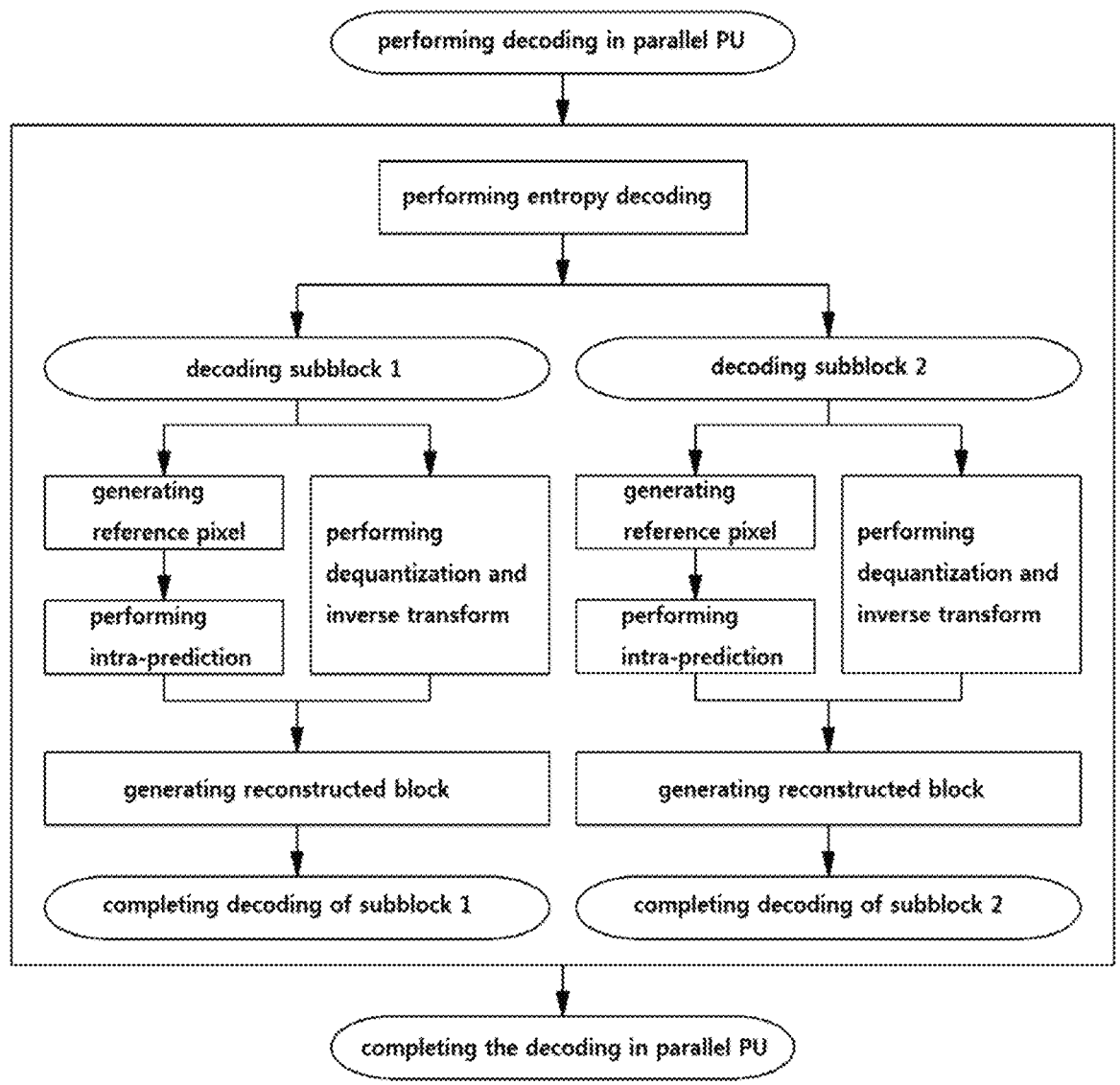
FIG. 18 is a view showing performing decoding on a parallel PU including two subblocks by using intra-prediction according to an embodiment of the present invention.

FIG. 18 is a view showing performing encoding/decoding on a parallel PU including two subblocks by using intra-prediction according to an embodiment of the present invention. Herein, the subblock may mean subblock.

In intra-prediction, generally, when encoding/decoding on a subblock 1 has completed, then encoding/decoding on a subblock 2 may be performed. However, according to the present invention, when performing entropy encoding/decoding (step of performing entropy encoding/decoding), encoding/decoding on two subblocks at the same time may start. Herein, encoding/decoding may be performed for a prediction mode and/or transform coefficient information on at least one subblock within a parallel PU, and encoding/decoding may be on performed at least one subblock at the same time.

In generating a reference pixel, final reference pixels may be generated by loading reference pixels on which encoding/decoding has completed, and which is used for intra-prediction, and performing filtering thereto. Herein, when a neighboring block is present on the same parallel PU, a virtual reference pixel may be generated in place of a reconstructed reference pixel. Alternatively, reference pixels may be generated in a parallel PU, and the generated reference pixels may be shared among subblocks within a parallel PU.

In intra-prediction, intra-prediction on a current block may be performed by using reconstructed reference pixels or virtual reference pixels.

In dequantization and inverse transform, generating a reference pixel, and performing intra-prediction may be performed at the same time.

In generating a reconstructed block, a reconstructed block may be generated by adding a reconstructed residual signal and an intra-prediction signal. Subsequently, encoding/decoding on blocks ½ may be ended.

Figure 19:
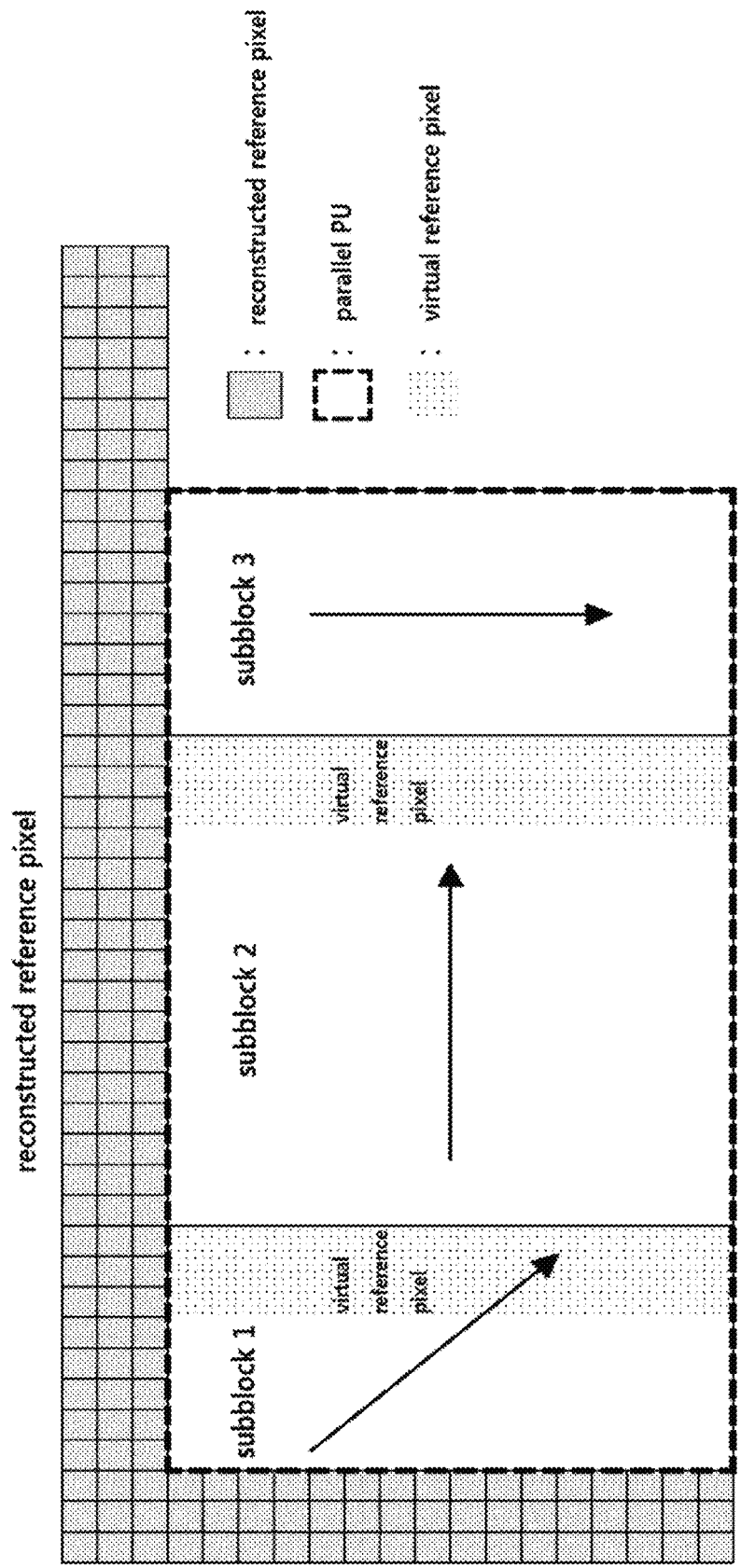
FIG. 19 is a view showing performing decoding on a parallel PU including three subblocks by using intra-prediction according to an embodiment of the present invention.

FIG. 19 is a view showing performing decoding on a parallel PU including three subblocks by using intra-prediction according to an embodiment of the present invention.

In an example shown in FIG. 19, in intra-prediction on each subblock, a reconstructed reference pixel and/or virtual reference pixel may be used. A dotted region represents a parallel PU. A prediction direction used in intra-prediction may be represented by using an arrow.

In case of a subblock 1, encoding/decoding on a neighboring block has completed, and thus intra-prediction may be performed by using a reconstructed reference pixel. An intra-prediction mode of the block 1 is a diagonal mode.

In case of a subblock 2, encoding/decoding on the same may be performed with a left subblock 1 at the same time, and virtual reference pixels within the subblock 1 may be generated by using an intra-prediction mode of the subblock 1. Accordingly, intra-prediction on the subblock 2 may be performed by using upper reconstructed reference pixels and/or left virtual reference pixels.

In case of a subblock 3, encoding/decoding on the same may be performed with the subblock 1 and/or subblock 2 at the same time, virtual reference pixels within the subblock 2 may be generated by using a horizontal mode that is an intra-prediction mode of the subblock 2. Accordingly, intra-prediction on the subblock 3 may be performed by using upper reconstructed reference pixels and/or left virtual reference pixels.

Figure 20:
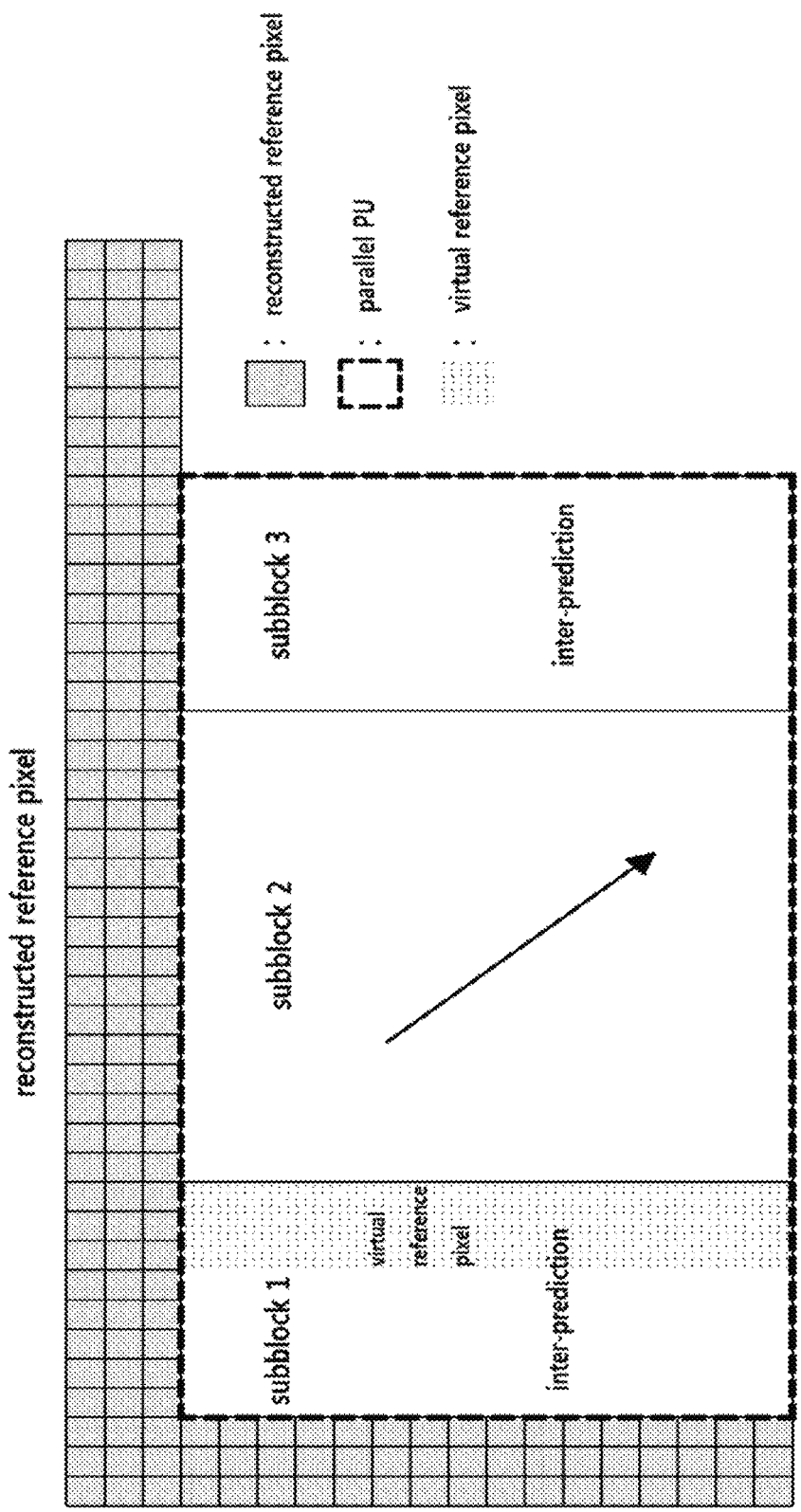
FIG. 20 is a view showing performing decoding on a parallel PU including three subblocks by using intra-prediction according to another embodiment of the present invention.

FIG. 20 is a view showing performing decoding on a parallel PU including three subblocks by using intra-prediction according to another embodiment of the present invention.

In an example shown FIG. 20, intra-prediction on each subblock may be performed by using reconstructed reference pixels and/or virtual reference pixels. A dotted region represents a parallel PU. A prediction direction used in intra-prediction may be represented by using an arrow.

Inter-prediction on a subblock 1 and a subblock 3 is performed, and intra-prediction on a subblock 2 is performed.

In case of the subblock 1, an inter-prediction mode is used, and thus encoding/decoding on the same may be performed without using a pixel of a neighboring block.

In case of the subblock 2, encoding/decoding on the same may be performed with a left subblock 1 at the same time, and virtual reference pixels within the subblock 1 may be generated by using an inter-prediction mode of the subblock 1. Accordingly, intra-prediction on the subblock 2 may be performed by using upper reconstructed reference pixels and/or left virtual reference pixels.

In case of the subblock 3, encoding/decoding on the same may be performed with the subblock 1 and/or subblock 2 at the same time, and an inter-prediction mode is used, and thus encoding/decoding on the same may be performed without using a pixel of a neighboring block.

For an arbitrary parallel PU, a unit predefined in the encoder/decoder may be used, or signaling through a header (SPS, PPS, etc.) or parameter set may be performed, and thus the same parallel PU is used in the encoder/decoder. Alternatively, a minimum square block size predefined in the encoder/decoder or signaled through a header or parameter set may be used as a parallel PU. Alternatively, when a block partitioning method using a quad tree, a binary tree, and a ternary tree is used, in case of binary tree and ternary tree partitioning, a block size of a parent node may be used as a parallel PU.

Whether or not to use a parallel prediction method of the present disclosure may be defined in a profile or may be signaled through a header (SPS, PPS, etc.) or parameter set.

When generating a virtual reference pixel, an accurate reference pixel may be generated by performing filtering (low pass filter, etc.) between the prediction signal and the reconstructed reference pixel rather than generating by only using a prediction signal of the neighboring block.

When a parallel prediction method is used, and intra-prediction is performed by using a virtual reference pixel, there is no significant difference in terms of prediction accuracy even multiple intra-predictions are used, and thus an amount of bits required for representing an intra-prediction mode can be reduced by limiting a number of intra-prediction modes.

Figure 21:
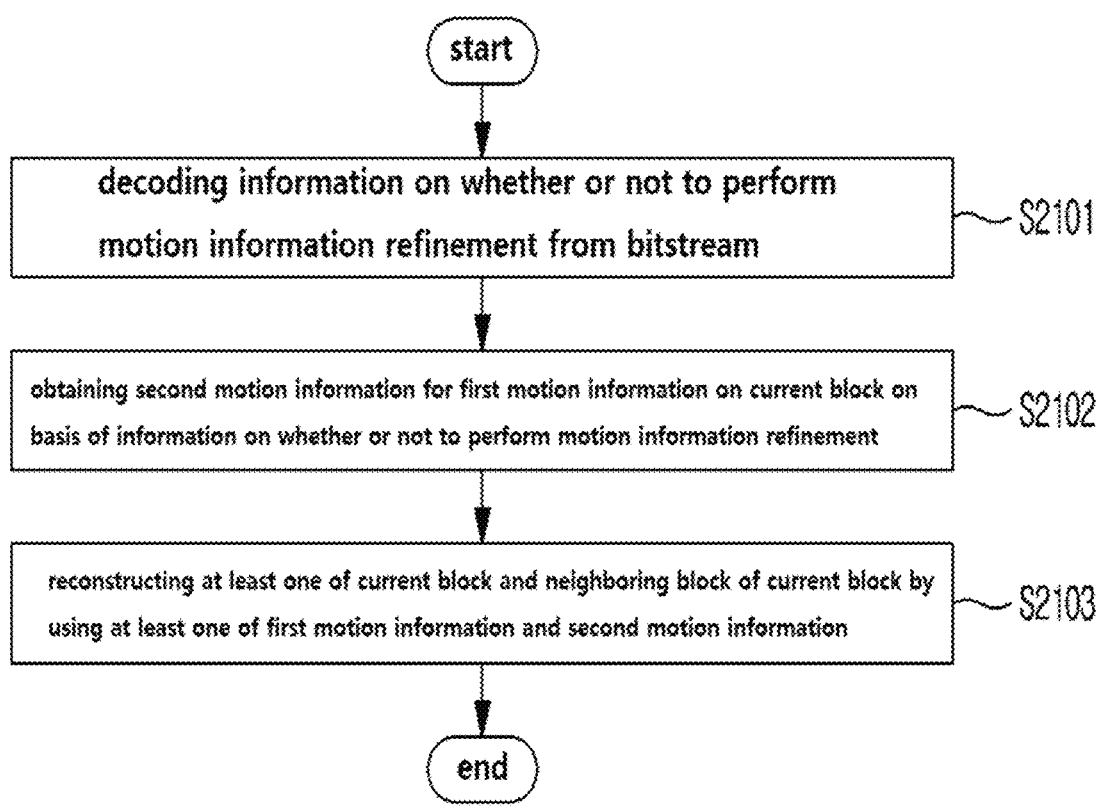
FIG. 21 is a view of a flowchart showing an image decoding method according to an embodiment of the present invention.

FIG. 21 is a view of a flowchart showing an image decoding method according to an embodiment of the present invention.

In S2101, the decoder may decode information on whether or not to perform motion information refinement from a bitstream.

Herein, the information on whether or not to perform motion information refinement may be signaled through at least one of a parameter set or video parameter set, a sequence parameter set, a subpicture parameter set, a picture parameter set, an adaptation parameter set, a slice header, a tile header, and a brick header.

In S2102, the decoder may obtain second motion information for first motion information on a current block on the basis of the information on whether or not to perform motion information refinement.

Herein, the first motion information may be initial motion information on the current block. In addition, the second motion information may be information obtained by performing refinement on the first motion information.

Meanwhile, when the current block is equal to or greater than a predetermined block size, the second motion information may be obtained by partitioning the current block into at least one subblock, and performing motion information refinement on the at least one subblock.

Meanwhile, when at least one of a width and a height of the current block is equal to or greater than a predetermined block size, the second motion information may be obtained by partitioning the current block into at least one subblock, and performing motion information refinement on the at least one subblock.

Herein, the predetermined block size may be 16.

Meanwhile, the initial motion information on the current block may be used as initial motion information on the subblock.

Meanwhile, the second motion information may be obtained by using a pixel value indicated by a candidate motion vector in a region within a L0 reference picture for the current block, and a pixel value indicated by a vector opposite to the candidate motion vector in a region within an L1 reference picture for the current block.

Meanwhile, the first motion information on the current block may be used for at least one of spatial motion vector prediction on a neighboring block of the current block, and determining a boundary strength of deblocking filtering.

Meanwhile, the second motion information on the current block may be used for predicting motion information on a col-block of the neighboring block of the current block.

In S2103, the decoder may reconstruct at least one of the current block and the neighboring block of the current block by using at least one of the first motion information and the second motion information.

Figure 22:
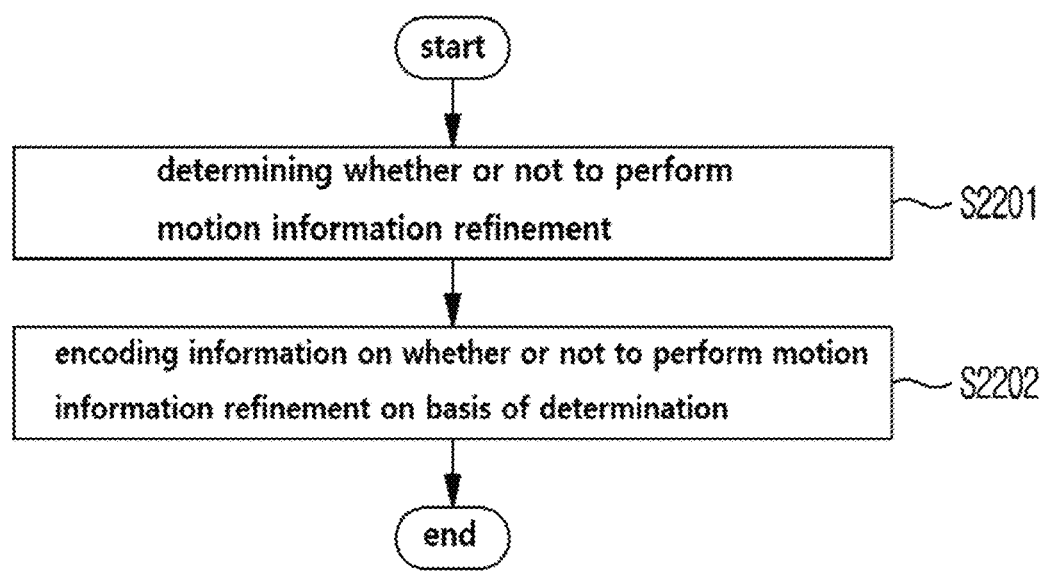
FIG. 22 is a view of a flowchart showing an image encoding method according to an embodiment of the present invention.

FIG. 22 is a view of a flowchart showing an image encoding method according to an embodiment of the present invention.

In S2201, the encoder may determine whether or not to perform motion information refinement.

In S2202, the encoder may encode information on whether or not to perform motion information refinement on the basis of the determination.

Herein, the information on whether or not to perform motion information refinement may be signaled through at least one of a parameter set or video parameter set (video parameter set), a sequence parameter set, a subpicture parameter set, a picture parameter set, an adaptation parameter set, a slice header, a tile header, and a brick header.

Meanwhile, according to the present invention, in a computer-readable non-transitory recording medium storing video data used in an image decoding method, the image data may include information on whether or not to perform motion information refinement. In addition, in the image decoding method, the information on whether or not to perform motion information refinement may be used for obtaining second motion information for first motion information on a current block, and at least one of the first motion information and the second motion information may be used for reconstructing at least one of the current block and a neighboring block of the current block.

The above embodiments may be performed in the same method in an encoder and a decoder.

At least one or a combination of the above embodiments may be used to encode/decode a video.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 or greater. For example, the above embodiments may be applied when a size of current block is 16×16 or greater. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type or a tile group type to which the above embodiments of the present invention are applied may be defined, and the above embodiments may be applied depending on the corresponding slice type or tile group type.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used to encode or decode an image.

The invention claimed is:

1. A method of decoding an image, the method comprising:
constructing a motion vector candidate list including a spatial motion vector and a temporal motion vector, from a neighboring block in a current picture including a current block and a col-block of the current block in a different picture from the current picture;
deriving a first motion vector of the current block using the motion vector candidate list;
decoding information on whether or not to perform motion vector refinement from a bitstream;
obtaining a second motion vector of the current block by refining a first motion vector of the current block based on the information on whether or not to perform motion vector refinement;
generating a prediction block of the current block in an inter-prediction mode based on the second motion vector; and
reconstructing the current block based on the prediction block,
wherein constructing the motion vector candidate list comprises:
entering a motion vector of the neighboring block as the spatial motion vector;
obtaining a refined motion vector of the col-block;
scaling the refined motion vector of the col-block; and
entering the scaled refined motion vector of the col-block as the temporal motion vector, and
wherein the motion vector of the neighboring block is excluded from the motion vector candidate list when the neighboring block is included in a region including the current block, the region being derived based on size information from the bitstream.

2. The method of claim 1, wherein the information on whether or not to perform motion vector refinement is signaled through at least one of a parameter set or video parameter set, a sequence parameter set, a subpicture parameter set, a picture parameter set, an adaptation parameter set, a slice header, a tile header, and a brick header.

3. The method of claim 1, wherein the second motion vector is obtained by partitioning the current block into at least one subblock, and performing motion vector refinement on the at least one subblock when at least one of a width and a height of the current block is greater than a predetermined block size.

4. The method of claim 3, wherein the predetermined block size is 16.

5. The method of claim 3, wherein an initial motion vector of the current block is used as an initial motion vector of the subblock.

6. The method of claim 1, wherein the second motion vector is obtained by using a pixel value indicated by a candidate motion vector in a region within an L0 reference picture for the current block, and using a pixel value indicated by a vector opposite to the candidate motion vector in a region within an L1 reference picture for the current block.

7. The method of claim 1, wherein the first motion vector of the current block is used for determining a boundary strength of deblocking filtering.

8. A method of encoding an image, the method comprising:
constructing a motion vector candidate list including a spatial motion vector and a temporal motion vector, from a neighboring block in a current picture including a current block and a col-block of the current block in a different picture from the current picture;
determining a first motion vector of the current block using the motion vector candidate list;
determining whether or not to perform motion vector refinement;
obtaining a second motion vector of the current block by refining a first motion vector of the current block based on the determination of whether or not to perform motion vector refinement;
generating a prediction block of the current block in an inter-prediction mode based on the second motion vector;
generating a residual block of the current block based on the prediction block; and
encoding information on whether or not to perform motion vector refinement based on the determination of whether or not to perform motion vector refinement,
wherein constructing the motion vector candidate list comprises:
entering a motion vector of the neighboring block as the spatial motion vector;
obtaining a refined motion vector of the col-block;
scaling the refined motion vector of the col-block; and
entering the scaled refined motion vector of the col-block as the temporal motion vector, and
wherein the motion vector of the neighboring block is excluded from the motion vector candidate list when the neighboring block is included in a region including the current block, the region being derived based on size information from a bitstream.

9. The method of claim 8, wherein the information on whether or not to perform motion vector refinement is loaded in at least one of a parameter set or video parameter set, a sequence parameter set, a subpicture parameter set, a picture parameter set, an adaptation parameter set, a slice header, a tile header, and a brick header.

10. The method of claim 8, wherein the second motion vector is obtained by partitioning the current block into at least one subblock, and performing motion vector refinement on the at least one subblock when at least one of a width and a height of the current block is greater than a predetermined block size.

11. The method of claim 10, wherein the predetermined block size is 16.

12. The method of claim 10, wherein an initial motion vector of the current block is used as initial motion vector of the subblock.

13. The method of claim 8, wherein the second motion vector is obtained by using a pixel value indicated by a candidate motion vector in a region within an L0 reference picture for the current block, and using a pixel value indicated by a vector opposite to the candidate motion vector in a region within an L1 reference picture for the current block.

14. The method of claim 8, wherein the first motion vector of the current block is used for determining a boundary strength of deblocking filtering.

15. An apparatus for transmitting data comprising a bitstream for an image, the apparatus comprising a processor configured to:
  obtain the bitstream for the image, the bitstream for the image being generated by an image encoding method; and
  transmit the bitstream,
  wherein the image encoding method comprises:
    constructing a motion vector candidate list including a spatial motion vector and a temporal motion vector, from a neighboring block in a current picture including a current block and a col-block of the current block in a different picture from the current picture;
    determining a first motion vector of the current block using the motion vector candidate list;
    determining whether or not to perform motion vector refinement;
    obtaining a second motion vector of the current block by refining a first motion vector of the current block based on the determination of whether or not to perform motion vector refinement;
    generating a prediction block of the current block in an inter-prediction mode based on the second motion vector;
    generating a residual block of the current block based on the prediction block; and
    encoding information on whether or not to perform motion vector refinement based on the determination of whether or not to perform motion vector refinement,
  wherein constructing the motion vector candidate list comprises:
    entering a motion vector of the neighboring block as the spatial motion vector;
    obtaining a refined motion vector of the col-block;
    scaling the refined motion vector of the col-block; and
    entering the scaled refined motion vector of the col-block as the temporal motion vector, and
  wherein the motion vector of the neighboring block is excluded from the motion vector candidate list when the neighboring block is included in a region including the current block, the region being derived based on size information from the bitstream.

* * * * *